United States Patent
Naik et al.

(10) Patent No.: US 10,904,791 B2
(45) Date of Patent: Jan. 26, 2021

(54) SYSTEM AND METHOD FOR OFFLOADING DATA AND VIDEO TRAFFIC TO A SUPPLEMENTAL DOWNLINK OVERLAY NETWORK

(71) Applicant: Saankhya Labs Pvt. Ltd., Bangalore (IN)

(72) Inventors: Parag Naik, Bangalore (IN); Arindam Chakraborty, Ghaziabad (IN); Anindya Saha, Bangalore (IN); Vishwakumara Kayargadde, Bangalore (IN)

(73) Assignee: Saankhya Labs Pvt. Ltd., Karnataka (IN)

( * ) Notice: Subject to any disclaimer, the term of this patent is extended or adjusted under 35 U.S.C. 154(b) by 0 days.

(21) Appl. No.: 16/591,595

(22) Filed: Oct. 2, 2019

(65) Prior Publication Data
US 2020/0112883 A1 Apr. 9, 2020

(30) Foreign Application Priority Data
Oct. 4, 2018 (IN) .............................. 201841037639

(51) Int. Cl.
*H04W 28/08* (2009.01)
*H04W 24/02* (2009.01)
*H04W 64/00* (2009.01)
*H04W 88/06* (2009.01)
*H04L 12/803* (2013.01)

(52) U.S. Cl.
CPC .......... *H04W 28/08* (2013.01); *H04W 24/02* (2013.01); *H04W 64/006* (2013.01); *H04W 88/06* (2013.01)

(58) Field of Classification Search
CPC ... H04W 28/08; H04W 24/02; H04W 64/006; H04W 88/06; H04L 47/125
See application file for complete search history.

(56) References Cited

U.S. PATENT DOCUMENTS

| | | | |
|---|---|---|---|
| 2015/0189569 A1* | 7/2015 | Visuri ................... | H04W 36/30 370/331 |
| 2016/0021007 A1* | 1/2016 | Shuman ................ | H04W 28/08 370/235 |
| 2016/0380820 A1* | 12/2016 | Horvitz ................. | H04W 4/029 370/254 |
| 2017/0078918 A1* | 3/2017 | He .................... | H04W 28/0205 |

* cited by examiner

*Primary Examiner* — Andrew Lai
*Assistant Examiner* — Harry H Kim

(57) ABSTRACT

A system for dynamically offloading data and video traffic to a broadcast offload core network from a cellular network or to the cellular network from the broadcast offload core network is provided. The system includes an analytics engine, a load manager, and a radio access network (RAN). The analytics engine captures geographical radio frequency (RF) information from a geographical RF information database. The geographical RF information includes an operator infrastructure information, a physical terrain information, a subscriber information, a coverage information, a signal quality information, and telecom traffic patterns. The analytics engine determines whether to offload the data and the video traffic to at least one of a unidirectional downlink network from a unicast network or the unicast network from the unidirectional downlink network by analyzing a hybrid cellular user equipment from a particular geographical location trying to access the data or video content.

27 Claims, 14 Drawing Sheets

SYSTEM AND METHOD FOR OFFLOADING DATA AND VIDEO TRAFFIC TO A SUPPLEMENTAL DOWNLINK OVERLAY NETWORK

CROSS-REFERENCE TO RELATED APPLICATIONS

This application claims priority to Indian provisional patent application no. 201841037639 filed on Oct. 4, 2018, the complete disclosure of which, in its entirety, is herein incorporated by reference.

BACKGROUND

Technical Field

The embodiment herein generally relates to a mechanism for dynamically switching traffic from a broadband network, such as a cellular network, to a unidirectional point to multipoint downlink network for offloading data and video traffic for optimum usage of the cellular network, and more particularly, to a system and method for offloading the data and the video traffic to a supplemental downlink overlay network.

Description of the Related Art

Present cellular technologies have an inherent capability of partitioning frequency and time resources between unicast and broadcast traffic. In a typical Radio Access Network (RAN), a base station serves a sector or a cell. When users in the cellular operator require providing broadcast services such as watching a live video, or a concert or a news event, the base station allocates resources from the available bandwidth to the users for accessing the requested services. Under such conditions, if an edge user requests for the services then several resources required to service the request goes up as a unicast resource is being used to cater to a broadband service. This is because the edge users are subject to a negative signal-to-interference-plus-noise ratio SINR values as the broadband services are subjected to inter-cell interference. In traditional cellular broadcast services (such as eMBMS), spectral and temporal resources (for example resource blocks) used are borrowed from resource blocks being used by other services. The allocation of a large number of resources to the broadcast services becomes a challenge as the allocation causes a lot of unicast services to remain unserved which leads to network congestion on a core network at peak usage hours. To cater to such needs, in 4G networks, the concept of "enhanced Mobile Broadcast and Multicast Services (eMBMS)" has been developed for natively allowing broadcast services. However, Video-on-Demand (VoD) services, such as videos from Amazon®, Netflix®, Google®, and YouTube® are not able to take benefit from the enhanced Mobile Broadcast and Multicast Services (eMBMS). Only live video, where there is simultaneous reception, can take benefit from the eMBMS. The video congestion problem is addressed by using a unidirectional downlink offload network as an overlay network in addition to the existing cellular network. Typically, such networks which primarily carry live broadcast content like are Single Frequency Networks (SFN) for enabling lower power consumption at the UEs. However, such networks are not optimally used and remain idle when there is no broadcast video. Under such conditions, the SFN network cannot be used for unicast data traffic that has different content intended for different UE's. A Further Enhanced Mobile Broadcast Multicast Service (FeMBMS) introduces a concept of a standalone eMBMS service for broadcast only offload on a separate carrier. However, it involves incorporation of new spectrum and associated costs, both in terms of spectrum acquisition as well as deployment. Further broadcast networks are controlled by broadcasters who do not use FeMBMS until now. The new spectrum will be utilized only during peak hours. Rest of the time the spectrum may be sub-optimally used.

Accordingly, there remains a need for a system and method for offloading unicast traffic, including but not limited to the data and the video traffic to a supplemental downlink overlay network that has been primarily configured for broadcast.

SUMMARY

In view of the foregoing, embodiments herein provide a system for dynamically offloading data and video traffic to a broadcast offload core network from a cellular network or to the cellular network from the broadcast offload core network. The system includes an analytics engine, a load manager, and a radio access network (RAN). The analytics engine captures geographical radio frequency (RF) information from a geographical radio frequency information database. The geographical RF information includes (i) an operator infrastructure information, (ii) a physical terrain information, (iii) a subscriber information, (iv) a coverage information, (v) a signal quality information, and (vi) telecom traffic patterns. The analytics engine determines whether to offload the data and the video traffic to at least one of (i) a unidirectional downlink network from a unicast network or (ii) the unicast network from the unidirectional downlink network by analysing at least one hybrid cellular user equipment (UE) from a particular geographical location that are trying to access the data or video content. The load manager provides an information on at least one of (i) different traffic types including a voice, the data, the video traffic, and associated information flows, (ii) a Host or Server information from which the data is fetched, and a service information, (iii) a location of a data consumer that is obtained from at least one of (a) a Gateway Mobile Location Centre (GMLC) server or (b) a Global Navigation Satellite System (GNSS) coordinates, and (iv) a user information and an identity of the at least one hybrid cellular user equipment (UE) to the analytics engine.

The radio access network (RAN) includes at least one Broadcast Radio Head (BRH) for offloading the data and the video traffic to the unidirectional downlink network from the unicast network. The unidirectional downlink network is operated in two modes. The two modes include a broadcast mode operating as a single frequency network (SFN) or Multi-frequency network (MFN), and a unicast mode. The at least one Broadcast Radio Head (BRH) is selected by the analytics engine based on the information provided by the load manager on the at least one hybrid cellular user equipment (UEs) from the particular geographical location that are trying to access the data or the video content. The analytics engine determines the at least one Broadcast Radio Head (BRH) to serve the at least one hybrid cellular user equipment (UE) with at least one of (i) a transmit power, (ii) a modulation or (iii) coding. The load manager performs a method of handling call sessions and implementing handoffs from the unicast network over the unidirectional downlink network. The method includes (a) querying a location of the at least one hybrid cellular user equipment from the Gateway Mobile Location Centre (GMLC) server, (b) querying the analytics engine on a way to serve the at least one hybrid cellular user equipment associated with a user in at least one of (i) a cellular network or (ii) unidirectional downlink, (c) determining if the radio access network (RAN) that is selected by the analytics engine is used in at least one of (i) the cellular network or (ii) the unidirectional downlink by querying the analytics engine, and (d) managing a call session with the at least one hybrid cellular user equipment (UE) if the at least one hybrid cellular user equipment (UE) is being served by the unidirectional downlink network. In some embodiments, the broadcast offload core network determines whether to offload the data and the video traffic in the broadcast mode operating as the single frequency network (SFN) or the unicast mode based on the location of the at least one hybrid cellular user equipment.

In some embodiments, the at least one hybrid cellular user equipment (UE) is capable of receiving at least one of (i) cellular signals or a Wi-Fi, and (ii) unidirectional downlink signals. In some embodiments, the at least one hybrid cellular user equipment (UE) conveys a packet error rate, bit error rates, network congestion indication using uplink scheduler delays and a signal-to-interference-plus-noise ratio (SINR) to the analytics engine for enabling the at least one Broadcast Radio Head (BRH) to modify a modulation-coding scheme of transmission in a given region.

In some embodiments, if the at least one hybrid cellular user equipment (UE) associated with the user moves from one cell to another cell, overall performance remains consistent and continuity of service is ensured.

In some embodiments, the unidirectional downlink network is partitioned into multiple clusters of Broadcast Radio Heads (BRHs), where a coordinated downlink that is implemented for a group of BRHs involved in each cluster.

In some embodiments, the unidirectional downlink network is utilized for serving a unicast, broadcast or multicast service, a return channel of existing RAN network is used.

In some embodiments, an overlay unidirectional downlink radio network based on a Digital Terrestrial Transmission (DTT) in conjunction with the RAN dynamically switches the unidirectional downlink network between a broadcast SFN mode or a broadcast Multi-frequency network (MFN) mode and a unicast downlink mode or a multicast downlink mode.

In some embodiments, the group of Broadcast Radio Heads (BRHs) are in at least one of (i) the broadcast SFN mode, or the broadcast MFN mode, or (ii) the unicast downlink mode or the multicast downlink mode.

In some embodiments, a unidirectional downlink that acts as supplemental downlink via at least one of (i) a digital terrestrial or (ii) a satellite network.

In some embodiments, the analytics engine creates a "Dynamic Virtual edge" contour by appropriately determining the at least one hybrid cellular user equipment (UE) in a given region based on the geographical RF information that is stored in the geographical RF information database. In some embodiments, appropriate BRHs are selected to schedule an offload transmission based on the "dynamic virtual edge".

In some embodiments, the at least one Broadcast Radio Head (BRH) includes single transmit chains or multiple transmit chains for implementing at least one of (i) a single-input single-output (SISO), (ii) a Multiple Input Single Output (MISO) or (iii) a multiple-input and multiple-output (MIMO) configuration in the at least one Broadcast Radio Head (BRH) based the unidirectional downlink network.

In some embodiments, the at least one Broadcast Radio Head (BRH) includes a radio frequency (RF) sniffing mechanism for sensing an ambient radio frequency (RF) environment incorporating a transmit signal cancellation mechanism for improved measurements.

In some embodiments, the system includes a radio frequency prediction model that predicts signal strengths, the Signal to Interference Noise Ratio (SINR) and a Channel State Information (CSI) for a geographical region of interest using a radio frequency (RF) propagation modeling system.

In some embodiments, the load manager provides the information on a measured packet jitter in a real-time transport protocol (RTP) traffic from which network congestion is indirectly inferred by the analytics engine.

In some embodiments, an observed time difference of arrival (OTDoA) of reference signals that are received from a multitude of the at least one BRH are determined and uploaded to the analytics engine through a Cellular uplink. In some embodiments, an information of the OTDoA of the reference signals enable finding a location of the at least one hybrid cellular UE.

In some embodiments, the at least one hybrid cellular UE includes inertial sensors that provide additional information about speed of the at least one hybrid cellular UE to enable unidirectional downlink signal parameters to be optimized depending on mobility conditions.

In some embodiments, the system includes a frame structure of a unidirectional downlink (offload) air interface for addressing the broadcast mode operating as the single frequency network (SFN) and the unicast mode. The frame structure includes broadcast super-frames and unicast super-frames carrying cell-specific reference signals.

In some embodiments, the unicast sub-frames include control and a payload to serve multiple user equipment's (UE's) in a specified region using a downlink map.

In some embodiments, the frame structure comprises an Entry preamble, a broadcast preamble, and broadcast sub-frames #0-# (N-1), a unicast preamble, a unicast sub-frame, and a configurable waveform.

In some embodiments, the Entry Preamble decides one or more parameters that are useful for the at least one hybrid cellular UE to receive an offload waveform for demodulation. In some embodiments, the Entry Preamble signals most basic information and is extremely robust. In some embodiments, the most basic information is received by the at least one hybrid cellular UE which is capable of receiving the most basic information at adverse channel conditions.

In some embodiments, receivers use the entry preamble for synchronization and tracking. In some embodiments, the entry preamble receives signals below noise floor in difficult channels based on design of an entry preamble waveform.

In some embodiments, the Broadcast sub-frames #0 to # (N-1) include the payload corresponding to Broadcast Traffic received from a Gateway.

In some embodiments, an optional timeslot in the frame structure enables insertion of the configurable waveform in the at least one BRH for channel sounding applications.

In one aspect, a method for dynamically offloading data and video traffic to a broadcast offload core network from a cellular network or to the cellular network from the broadcast offload core network is provided. The method includes (a) capturing geographical radio frequency (RF) information from a geographical radio frequency (RF) information database and providing the geographical radio frequency (RF) information to an analytics engine, (b) providing, by a load manager, an information on at least one of: (i) different traffic types including a voice, the data, the video and associated information flows, (ii) a Host or Server information from which the data is fetched, and service information, (iii) a location of a data consumer that is obtained from at least one of (a) a Gateway Mobile Location Centre (GMLC) server or (b) a Global Navigation Satellite System (GNSS) coordinates, and (iv) a user information and an identity of the at least one hybrid cellular user equipment (UE) to the analytics engine, and (c) offloading, by a radio access network (RAN), the data and the video traffic to a unidirectional downlink network from a unicast network. The geographical radio frequency (RF) information includes (i) an operator infrastructure information, (ii) a physical terrain information, (iii) a subscriber information, (iv) a coverage information, (v) a signal quality information, and (vi) telecom traffic patterns. The analytics engine determines whether to offload the data and the video traffic to at least one of (i) a unidirectional downlink network from a unicast network or (ii) the unicast network from the unidirectional downlink network by analysing the at least one hybrid cellular user equipment (UE) from a particular geographical location that are trying to access the data or video content. The analytics engine determines the at least one Broadcast Radio Head (BRH) to serve the at least one hybrid cellular user equipment (UE) with at least one of (i) a transmit power, (ii) a modulation or (iii) coding.

The radio access network (RAN) includes at least one Broadcast Radio Head (BRH). The unidirectional downlink network is operated in two modes that include a broadcast mode operating as a single frequency network (SFN) or Multi-frequency network (MFN), and a unicast mode. The at least one Broadcast Radio Head (BRH) is selected by the analytics engine based on the information provided by the load manager on the at least one hybrid cellular user equipment (UE) from the particular geographical location that are trying to access the data or the video content. The load manager performs a method of handling call sessions and implementing handoffs from the unicast network over the unidirectional downlink network. The method includes (a) querying a location of the at least one hybrid cellular user equipment (UE) from the Gateway Mobile Location Center (GMLC) server, (b) querying the analytics engine on a way to serve the at least one hybrid cellular user equipment associated with a user in at least one of (i) a cellular network or (ii) unidirectional downlink, (c) determining if the radio access network (RAN) that is selected by the analytics engine is used in at least one of (i) the cellular network or (ii) the unidirectional downlink by querying the analytics engine, and (d) managing a call session with the at least one hybrid cellular user equipment (UE) if the at least one hybrid cellular user equipment (UE) is being served by the unidirectional downlink network.

In some embodiments, the at least one Broadcast Radio Head (BRH) includes single transmit chains or multiple transmit chains for implementing a single-input single-output (SISO), a Multiple Input Single Output (MISO) or a multiple-input and multiple-output (MIMO) configuration in the at least one Broadcast Radio Head (BRH) based the unidirectional downlink network.

In some embodiments, the at least one Broadcast Radio Head (BRH) includes a Radio Frequency (RF) sniffing mechanism for sensing an ambient Radio Frequency (RF) environment incorporating a transmit signal cancellation mechanism for improved measurements.

In some embodiments, the method includes providing, using the load manager, the information on a measured packet jitter in a real-time transport protocol (RTP) traffic from which network congestion is inferred by the analytics engine.

In some embodiments, the method includes predicting, by a radio frequency (RF) prediction model, signal strengths, the Signal to Interference Noise Ratio (SINR) and a Channel State Information (CSI) for a geographical region of interest using a radio frequency (RF) propagation modeling system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
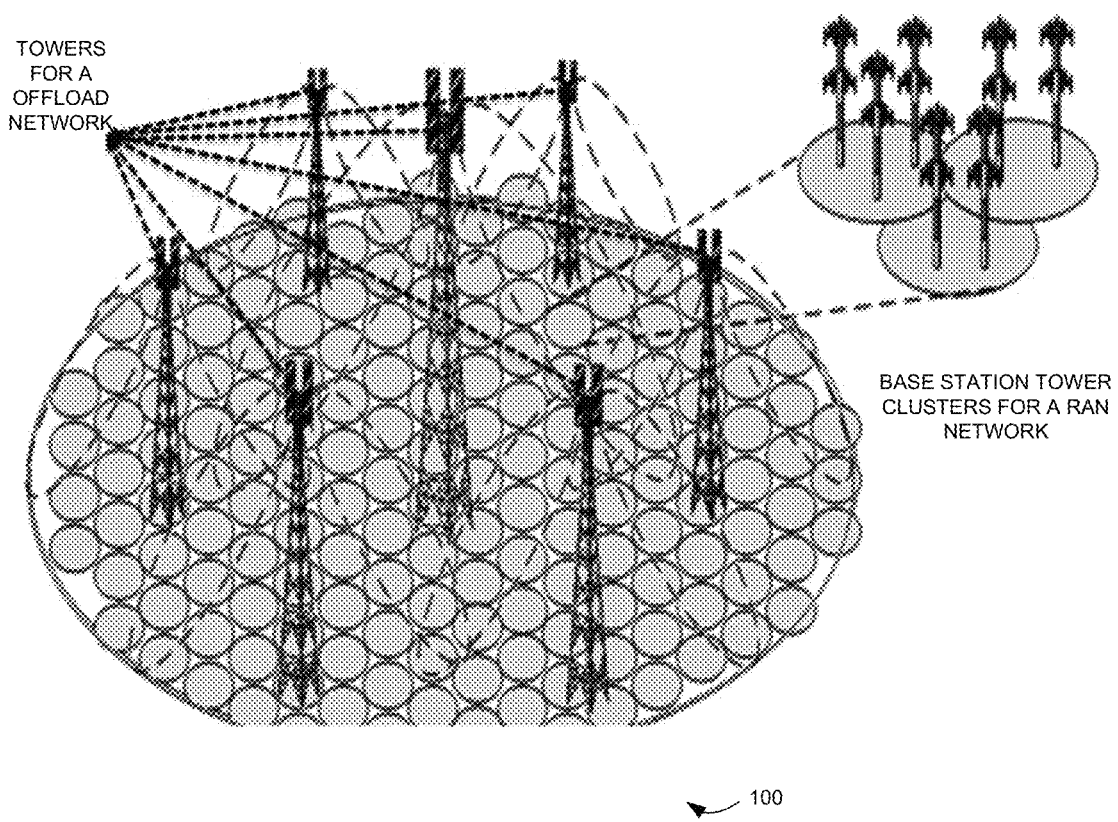
FIG. 1 illustrates a unidirectional downlink radio network based on a Digital Terrestrial Transmission (DTT) in conjunction with a Radio Access Network (RAN) according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for offloading data and video traffic to a supplemental downlink overlay network. In addition, a unidirectional point to multipoint network needs to be capable of dynamically switching between a broadcast Single Frequency Network (SFN) or multi-frequency network (MFN) and a unicast supplemental downlink mode for optimum usage. The embodiments herein achieve this by implementing a unidirectional point to a multipoint downlink channel or multipoint downlink channels operating in a terrestrial frequency band (e.g. VHF/UHF TV) or as a satellite downlink in addition to the existing Radio Access Network (RAN). The VHF and UHF frequencies may include excellent propagation characteristics with comparatively much larger ranges.

The unidirectional point to a multipoint downlink network may be primarily used for broadcast traffic. After satisfying the needs of the broadcast traffic, the remaining resources, e.g. resource blocks of the unidirectional point to the multipoint downlink network may be used for offloading unicast traffic from the cellular network. One of the major components of a Broadcast Offload Packet Core (BO-PC) is an analytics engine that may select potential data streams for broadcast on the unidirectional downlink. The analytics engine may also aid in distributing unicast traffic between the cellular network and the unidirectional downlink network. Referring now to the drawings, and more particularly to FIGS. 1 through 14, where similar reference characters denote corresponding features consistently throughout the figures, there are shown preferred embodiments.

FIG. 1 illustrates a unidirectional downlink radio network 100 based on a Digital Terrestrial Transmission (DTT) in conjunction with a Radio Access Network (RAN) according to some embodiments herein. The unidirectional downlink radio network 100 includes towers mounted with radios. In some embodiments, the radios for the unidirectional downlink network 100 operates in VHF/UHF range. In some embodiments, the radios are capable of servicing broadcast services and unicast services. In some embodiments, offload radios on the towers include multiple configurations such as very high frequency and/or ultra-high frequency (VHF/UHF) digital terrestrial network that includes a combination of a High-Power High Tower (HPHT) or a Low-Power Low Tower (LPLT) or a Medium-Power Medium Tower (MPMT) transmitter along with a number of Low Power Low Tower (LPLT) depending on a terrain to be covered and a desired coverage. In some embodiments, the towers are deployed in a manner similar to a cellular network. Typically, these frequency bands are expected to be disjoint from RAN radios, e.g. 2G/3G/4G/5G and much larger reach. In some embodiments, UHF bands or VHF bands are used for illustration. More generically, an implementation does not assume any particular frequency for the unidirectional downlink.

In some embodiments, a unidirectional downlink radio on a tower may cater to a single cell or multiple cells of the cellular network. In some embodiments, network planning for a unidirectional downlink transmitter is different from conventional cellular planning since it is not constrained by the link budget of an uplink path. The unidirectional downlink radio network based on the Digital Terrestrial Transmission (DTT) in conjunction with the RAN caters to a generic transmission infrastructure including a very low power small cell such as indoor transmitters. For a broadcast application, the same content is transmitted in a time-aligned fashion using suitable modulation schemes, e.g. an Orthogonal Frequency Division Multiplexing (OFDM)). In some embodiments, "Symbols" received at a User Equipment (UE) is an overlap of all the transmissions from the towers that creates a Single Frequency Network (SFN) due to which "Signal to Interference and Noise Ratio (SINR)" of a signal may be consistently greater than a desired threshold value across the unidirectional downlink network 100. This contrasts with cellular networks, where the Signal to Interference plus Noise Ratio (SINR) degrades significantly at a cell edge when the frequency re-use factor is one. In some embodiments, the desired threshold value of the SINR guarantees a minimum desired data throughput across the SFN network.

Similar to the broadcast traffic, the unicast traffic is offloaded to the unidirectional downlink network 100. In some embodiments, the SFN includes limited benefits in a unicast offload. In such cases, Broadcast Radio Head(s) (BRH(s)) are used for carrying unicast offload data to transmit a signal. This allows re-use of bandwidth by other BRHs. In the unicast offload, when the UE is located in a region where a received signal from multiple BRHs include similar strengths, the same content is synchronously transmitted from some or all of them, which may improve coverage and mitigate interference, at a slight cost of frequency reuse. More generically, the unidirectional downlink network 100 is partitioned into multiple clusters of Broadcast Radio Heads (BRHs), where a coordinated downlink that is implemented for a group of BRHs involved in each cluster. In some embodiments, an overlay unidirectional downlink radio network based on the Digital Terrestrial Transmission (DTT) in conjunction with the RAN dynamically switches the unidirectional downlink network 100 between a broadcast single frequency network (SFN) or Multi-frequency network (MFN) mode and a unicast downlink mode or a multicast downlink mode. In some embodiments, the unidirectional downlink network 100 is extensible to any frequency band or spectrum and may work with any future broadcast technologies.

In some embodiments, an offload network works in at least one of (i) a single frequency network (SFN) and (ii) a Unicast mode. In some embodiments, creation of the SFN network provides benefits of a coordinated effort to transmit multimedia streams while minimizing consumed wireless resources. Transmitting the multimedia streams using the SFN leads to significant improvements in utilization of wireless resources compared to transmitting the multimedia streams using the unicast mode. This is because in the SFN mode coordinated cells are sending data using identical radio signals, and thus receivers at cell edges may get multiple copies of the same data from different base stations. In some embodiments, while the multiple copies are considered as inter-cell interference in independent cells and the multiple copies are translated into useful signal energy thus providing network gain in the SFN. In some embodiments, if the UE associated with a user moves from one cell to another cell overall performance remains consistent, and continuity of service is ensured. In addition, the network gain obtained in SFN enables deep indoor reception which is not possible otherwise.

The unidirectional downlink network 100 is operated in two modes depending on a type of traffic such as (i) Broadcast services, e.g. Live Video and (ii) Unicast services that services the edge users and those which are likely to undergo handoff between different RAN cells.

The Broadcast services are scheduled and transmitted in a given region using the unidirectional downlink network 100 by operating in the SFN mode. The unidirectional downlink network 100 is utilized for serving a unicast service, broadcast or and a multicast service a return channel of existing RAN network is used.

Figure 2:
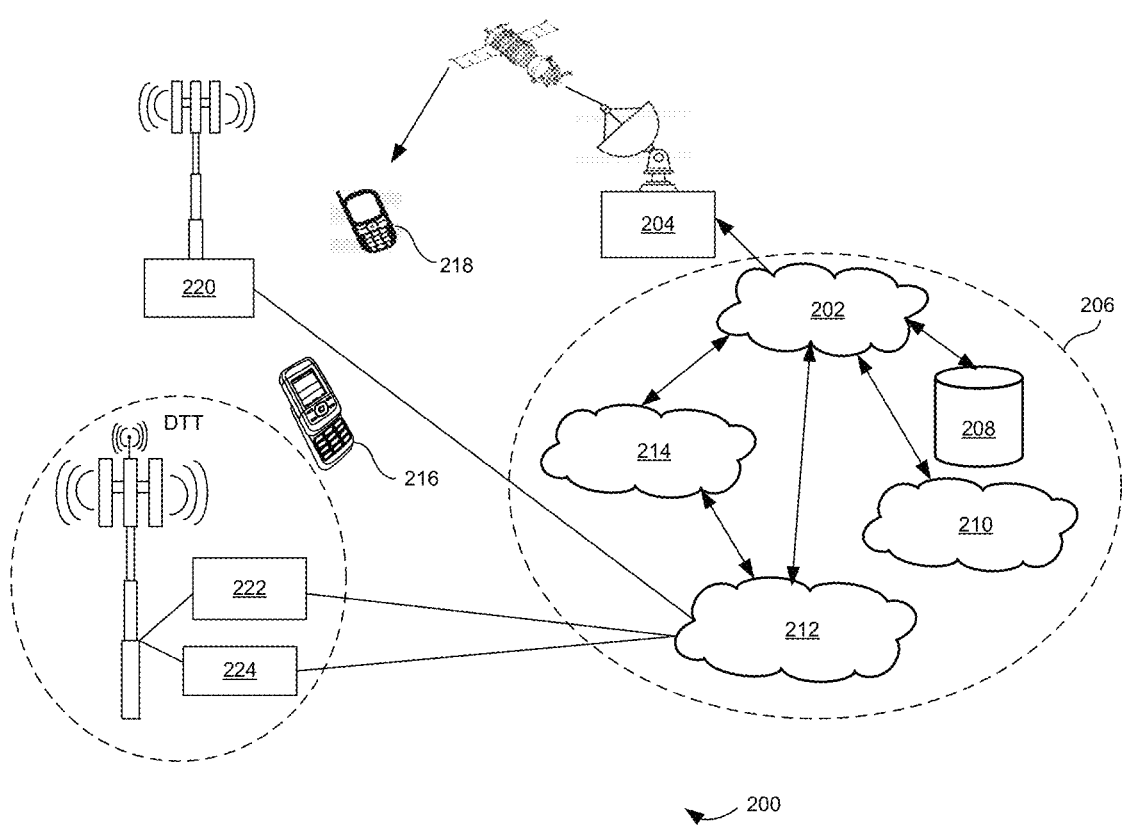
FIG. 2 is a block diagram that illustrates a broadcast offload network and Radio Access Network (RAN) with an analytics engine in a core network according to some embodiments herein.

FIG. 2 is a block diagram 200 that illustrates a broadcast offload network and Radio Access Network (RAN) with an analytics engine in a core network according to some embodiments herein. The block diagram 200 includes a Broadcast/Offload Packet Core (BO-PC) 202, a satellite earth station 204 and a converged core network 206, a converged cellular DTT User Equipment (UE) 216, a converged cellular/satellite UE 218, a cellular base station 220, a second cellular base station 222 and at least one Broadcast Radio Head (BRH) 224. In some embodiments, the converged core network 206 includes the "Broadcast/Offload Packet Core (BO-PC) 202 along with a cellular core. The converged core network 206 includes a group of existing elements that includes a Content Delivery Network (CDN) 208, world wide web 210, an IP Backhaul network 212 and a cellular packet core 214 and the Broadcast Offload Packet Core (BO-PC) 202. The converged core network provides services to at least one of (i) the converged cellular DTT UE 216 or the converged cellular/satellite UE 218 using the satellite earth station 204, the cellular base station 220, the second cellular base station 222 and the at least one Broadcast Radio Head (BRH) 224. In some embodiments, the legacy IP Backhaul network 212 is reused for connectivity to the at least one Broadcast Radio Head (BRH) 224. The "BO-PC 202 serves UHF/VHF based "Digital Terrestrial Transmission (DTT)" and a Satellite-based Unidirectional Downlink. In case of digital terrestrial transmission (DTT) based unidirectional downlink, the legacy IP backhaul network 212 may be used to deliver offloaded traffic at broadcast and unicast to the at least one BRH 224 collocated with the second cellular base station 222. In some embodiments, the cellular connectivity may have low throughput if locations include poor backhaul. In some embodiments, a satellite downlink may be used to bypass the legacy IP backhaul network 212 and deliver the content e.g. a rich video directly to the converged cellular/satellite UE 218 without any action initiated by a user. In some embodiments, this task of offloading traffic is done by the BO-PC 202 itself. In some embodiments, any home network connected to the converged UE 218, which further distributes the content to personal devices. In some embodiments, the personal devices, without limitation, maybe a mobile phone, a Personal Digital Assistant (PDA), a tablet, a desktop computer, or a laptop.

In some embodiments, a broadcast offload network and a RAN network includes five key components. The five key components of the broadcast offload network which enables the broadcast offload network to switch between an SFN mode and a Unicast mode are as follows: (i) the at least one Broadcast Radio Head (BRH) 224, (ii) the User Equipment (UE) with capability of receiving a unidirectional downlink through at least one of (a) a Digital Terrestrial or (b) a Satellite network, in addition to having a Cellular modem capability, (iii) the analytics engine that is a part of the Core Network, (iv) a SDR Implementation of Radios, the SDR implements the at least one Broadcast Radio Head (BRH) 224 and the User Equipment, and (v) a frame structure for offload air interface.

Figure 3:
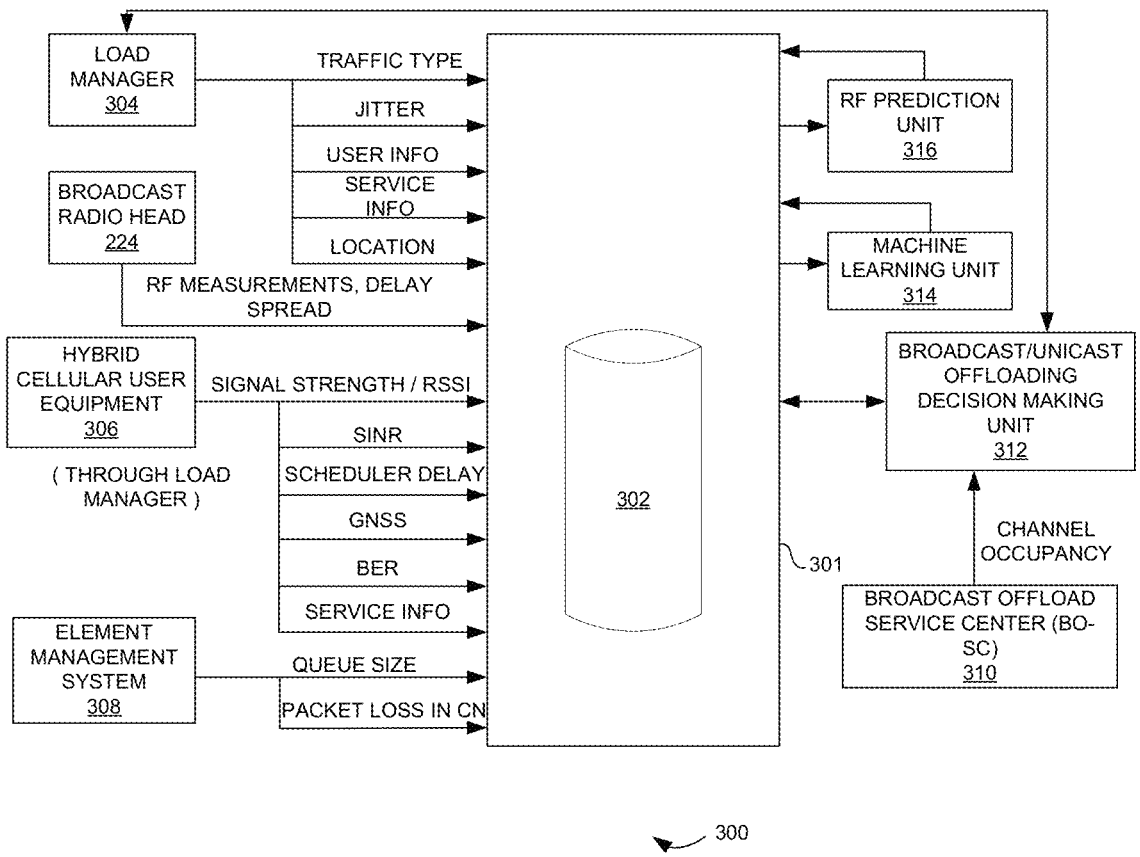
FIG. 3 is a block diagram that illustrates information flow in an analytics engine according to some embodiments herein.

FIG. 3 is a block diagram 300 that illustrates information flow in an analytics engine 301 according to some embodiments herein. The block diagram 300 includes the analytics engine 301 which includes a database 302 that captures information from a Load Manager 304, a Host/Server, the at least one Broadcast Radio Head (BRH) 224, a hybrid cellular User Equipment (UE) 306, an Element Management System or a Self-Optimization Network EMS/SON 308, a Broadcast/Offload Service Center (BO-SC) 310, a broadcast/unicast offloading decision-making unit 312, a data processing/Machine Learning (ML) unit 314 and a RF prediction unit 316.

In some embodiments, information or a data captured in a layered structure is indexed based on a geographical location i.e. the latitude and the longitude. In some embodiments, the element management system (EMS) 308 includes systems and applications for managing network elements (NE) on a network element-management layer (NEL) of a Telecommunications Management Network (TMN) model. In some embodiments, the Self-Organizing Network (SON) is an automation technology designed to make planning, configuration, management, optimization and healing of mobile radio access networks simpler and faster.

The analytics engine 301 captures geographical radio frequency (RF) information from a geographical database. The geographical radio frequency (RF) information includes (i) an operator infrastructure information, (ii) a physical terrain information, (iii) a subscriber information, (iv) a coverage information, (v) a signal quality information, and (vi) telecom traffic patterns. The analytics engine 301 determines whether to offload data and video traffic to at least one of (i) a unidirectional downlink network from a unicast network or (ii) the unicast network from the unidirectional downlink network by analyzing the hybrid cellular user equipment 306 from a particular geographical location that are trying to access the data or video content.

In some embodiments, the analytics engine 301 includes an RF propagation modeling unit that predicts signal strengths, Signal to Interference Noise Ratio (SINR) and Channel State Information (CSI) for a geographical region of interest using a radio frequency (RF) propagation modeling system. The RF propagation modeling system performs an RF Prediction Capability process that stores and updates and refines RF profiles of a cellular downlink network and a unidirectional downlink network. The RF propagation modeling unit predicts one or more parameterized values corresponding to terrain, building information, vegetation, paths taken for line of sight, non-line-of-sight (NLOS) propagation, multipath, etc. In some embodiments, estimation of these parameters enables a selection of best-suited modulation and coding scheme for a downlink channel. In some embodiments, network traffic patterns are shown to be significantly time-dependent. In some embodiments, traffic peaks that are characterized by bouncing busy hour for each site may be different. A time-series traffic prediction model may be derived using standard machine learning techniques, such as deep neural networks. In some embodiments, signal strengths are accurately predicted by a tuned RF propagation model, Signal to Noise Ratio (SINR) may be traffic intensity dependent. The time-series traffic prediction model may predict the SINR at any time of day. The time-series traffic prediction model may determine the modulation and coding of a downlink. In some embodiments, if a MIMO or MISO based BRH is used, a best suited pre-coding matrix is determined based on the capability of the hybrid cellular UE 306.

The RF Prediction capability performs a link budget calculation for edge users and the RF Prediction capability computes precise power required to serve them while keeping an interference for adjacent users or UEs to a minimum. The analytics engine 301 may modulate a downlink transmit power from the at least one Broadcast Radio Head (BRH) 224 or the Cellular base station 220. In some embodiments, this method of precise power control helps in reducing interference thereby improving the Signal to Interference Noise Ratio (SINR) at the UEs thus increasing the effective throughput for the ongoing traffic. In some embodiments, the transmit power is controlled based on a "Dynamic edge", where the transmit power contributes to the operational expenditure of a Cellular operator. In some embodiments, a Broadcast Radio head operator may significantly reduce the transmit power compared to a scenario when the transmit power is to be kept constant throughout.

The analytics engine 301 may include a scalable parallel computing capability to continuously gather information from the entire network, refine the gathered information and gain insight about key parameters which are obtained by the database 302. In some embodiments, the analytics engine 301 includes data analytics tools that derive secondary information from primary information. The analytics engine 301 determines the most suitable content that is added to a broadcast stream from traffic flow information. The most suitable content may be consumed synchronously by all users via an SFN network. The analytics engine 301 determines a content which is sent on a non-real time basis over a broadcast network to be cached at the hybrid cellular UE 306 to provide user experiences that may closely resemble on-demand services. The unidirectional downlink may be used to offload unicast traffic if there is no broadcast stream or non-real time content.

The analytics engine 301 includes a complete map of the at least one BRH 224 deployment for a given region. In some embodiments, coverage information of all BRHs is provided to the analytics engine 301. In some embodiments, the most suited BRH may be selected if the unidirectional downlink is selected. In some embodiments, appropriate clusters may be selected to serve the hybrid cellular UE 306 using a Coordinated Multipoint downlink if the hybrid cellular UE 306 is in an area located at equal distance from one or more BRHs. In some embodiments, the same content may be sent in a time-aligned manner from all the BRHs in the cluster.

The load manager 304 provides information that includes (i) different traffic types, e.g. a voice, a data, a video, and an associated information flows, (ii) the Host or Server information from which the data is getting fetched (source IP address), service information, (iii) a location of a data consumer that is obtained from a Gateway Mobile Location Center (GMLC), (iv) a user information, and (v) measured packet jitter in a Real-time transport protocol (RTP) traffic from which network congestion is inferred by the analytics engine 301. A radio access network (RAN) that includes the at least one Broadcast Radio Head (BRH) 224 for offloading the data and the video traffic to the unidirectional downlink network from the unicast network. The unidirectional downlink network is operated in two modes that include a broadcast mode operating as a single frequency network (SFN) or Multi-frequency network (MFN), and a unicast mode. The at least one Broadcast Radio Head (BRH) 224 is selected by the analytics engine 301 based on the information provided by the load manager 304 on the hybrid cellular user equipment 306 from the particular geographical location that are trying to access the data or the video content. In some embodiments, the at least one BRH 224 provides information about (i) a Radio Frequency RF sensing to determine blockers or interferers at an in-band operation and an out-of-band operation and a spectral leakage from adjacent channels, (ii) a delay spread and multipath propagation characteristics of a channel between neighboring BRHs to provide an accurate characterization of the channel. In some embodiments, if the accurate channel is estimated, the accurate channel may be used for accurately predicting a channel estimate for other locations.

In some embodiments, radio heads that are used for the at least one Broadcast Radio Head (BRH) 224 are Software Defined Radio (SDR) implementations. In some embodiments, the radio heads may have an ability to switch a Physical layer (PHY) layer standard between a Broadcast standard and a Unicast standard. This enables the Core Network to download Physical layer firmware and Link Layer firmware such as L1 and L2 layers corresponding to at least one of an SFN waveform or a Unicast mode waveform. The benefits of over air updates are leveraged by a radio head due to its Software-defined nature. The Software-defined nature of the radio heads, due to its programmability enables upgrade as well as amenable to future Self Organized Network optimizations as decided by a Network operator. The SFN waveform may be any next-generation broadcast (NGB) waveform that is specific to geography of choice such as ATSC3.0/DVB-T2/ATSC-1.0/DVB-T/ISDB-T/CMDBT modified to enable unicast operation. The Unicast waveform is a derivative of any RAN waveform such as IEEE802.22, WiMAX or 4G with the "downlink only" mode supported or any broadcast waveforms such as DVB-T2 or ATSC 3.0 modified suitably for multi user access.

The hybrid cellular User Equipment (UE) 306 provides information on (i) parameters corresponding to reference signal strengths, Signal to noise ratio (SINR) and the overall signal quality for RAN, available from a cellular modem and (ii) a location information gathered from a GNSS signal by pushing through the load manager 304. In some embodiments, the information corresponds to the parameter is continuously refined and updated as part of an RF prediction capability process in the database 302. In some embodiments, the absence of the GNSS is a strong indicator of whether the hybrid cellular UE 306 is present in at least one of (i) indoor or (ii) outdoor. In some embodiments, delay in scheduled response in a cellular uplink is used to obtain a measure of congestion.

In some embodiments, a middleware is running in the hybrid cellular UE 306 includes potential use cases where new content is to be broadcasted by a broadcast subnetwork or removed from the hybrid cellular UE 306. In some embodiments, the middleware provides user migrating from one SFN network to another SFN, or to a location where there is no SFN network for a mobile user. If a live stream is added, the middleware may terminate a unicast session going on in the hybrid cellular UE 306 and start a broadcast receiving process. If a broadcast stream is no longer available, the middleware may close the broadcast receiving process and initiates a new unicast session starting from same time instant. In both cases, the load Manager 304 may be notified.

The load manager 304 performs a method of handling call sessions and implementing handoffs from the unicast network over the unidirectional downlink network. The method includes (a) querying a location of the hybrid cellular user equipment (UE) 306 from the Gateway Mobile Location Centre (GMLC) server, (b) querying the analytics engine 301 on a way to serve the hybrid cellular user equipment 306 associated with a user in at least one of (i) a cellular network or (ii) unidirectional downlink, (c) determining if the radio access network (RAN) that is selected by the analytics engine 301 is used in at least one of (i) a cellular network or (ii) the unidirectional downlink by querying the analytics engine (301); and (d) managing a call session with the hybrid cellular user equipment (UE) 306 if the hybrid cellular user equipment (UE) 306 is being served by the unidirectional downlink network.

In some embodiments, the location of the hybrid cellular UE 306 provided by the GMLC server is used for gathering information for tracking users. In a given cellular region or unidirectional downlink network region, the location of the hybrid cellular UE 306 finds out an edge of a network dynamically. In some embodiments, the analytics engine 301 defines an extreme edge user as being on a limit of a "dynamic virtual edge" as applicable for a given cell. The cells formed on the basis of "dynamic virtual edge" enable lower power consumption and requires smaller guard interval in the OFDM frames transmitted by the at least one BRH 224, thereby improving spectral efficiency. Based on metrics derived from the analytics engine 301, the network is able to predict a user location to determine appropriate handoffs for networks.

Figure 4:
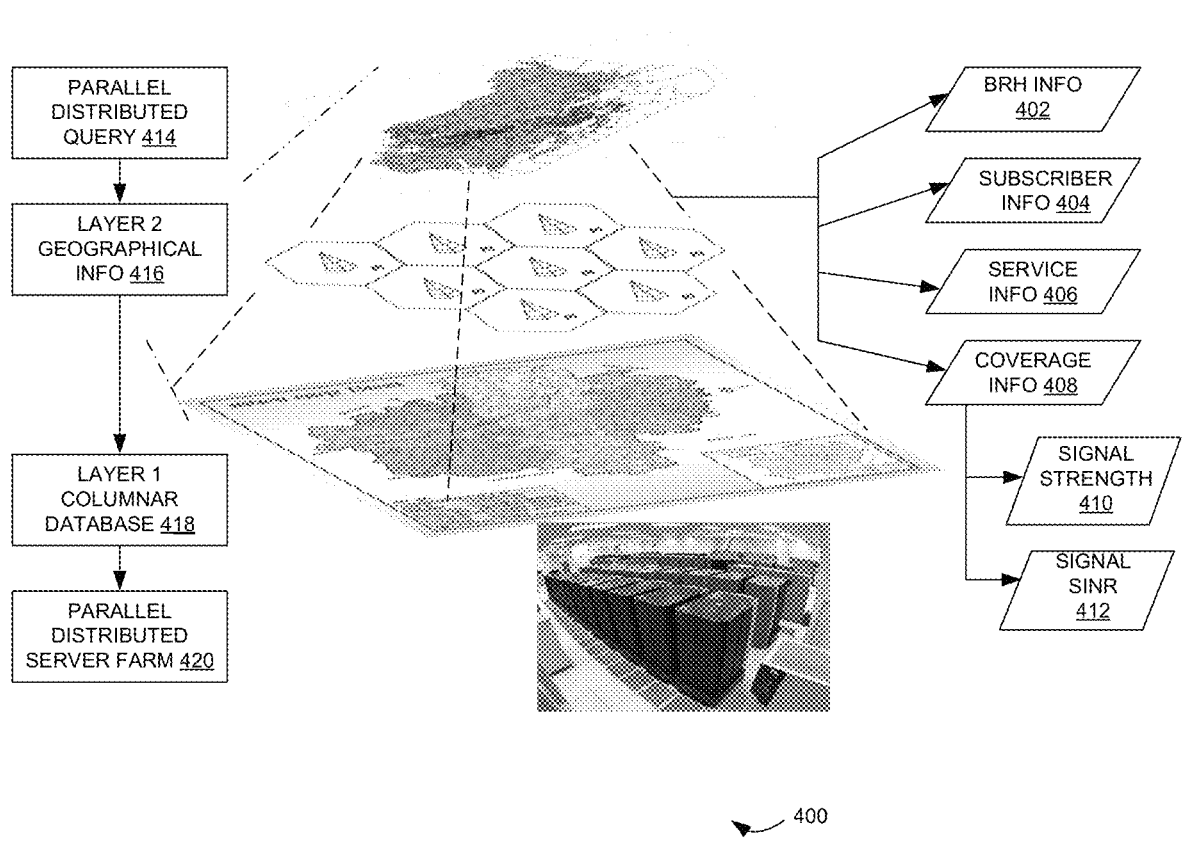
FIG. 4 is a block diagram that illustrates a database of the analytics engine according to some embodiments herein.

FIG. 4 is a block diagram 400 that illustrates the database 302 of the analytics engine 301 according to some embodiments herein. The analytics engine 301 includes a geographical radio frequency (RF) information database. The geographical radio frequency (RF) information database captures information of an operator infrastructure, BRH information 402, subscriber information 404, service information 406, coverage information 408 that includes signal strength 410 and signal SINR 412. In some embodiments, a parallel distributed query 414 to the geographical radio frequency (RF) information database involves passing on latitude and longitude of a particular location. In return, the geographical radio frequency (RF) information database fetches a radio frequency RF conditions and a best possible channel (the cellular or the unidirectional downlink) to connect to the location. In some embodiments, the geographical radio frequency (RF) information database is constructed in the form of a layered structure. The lowest layer 420 is the cluster of computing and storage resources consisting of parallel distributed server farm, operating systems and hypervisors and orchestrating mechanism, needed to implement virtualized network functions. The next layer (layer 1) 418 is the columnar database that efficiently stores and accesses the data. The next layer (layer 2) 416 is the geographical RF information layer, which includes terrain and clutter data along with demographic information, along with information related to the service provider infrastructure, including the locations and attributes (e.g. tower heights, radiated power, antenna patterns etc.) related to cellular towers, equipment's and Broadcast Radio Heads. This layer also includes measured and predicted values related to the RF signal and traffic patterns.

Figure 5:
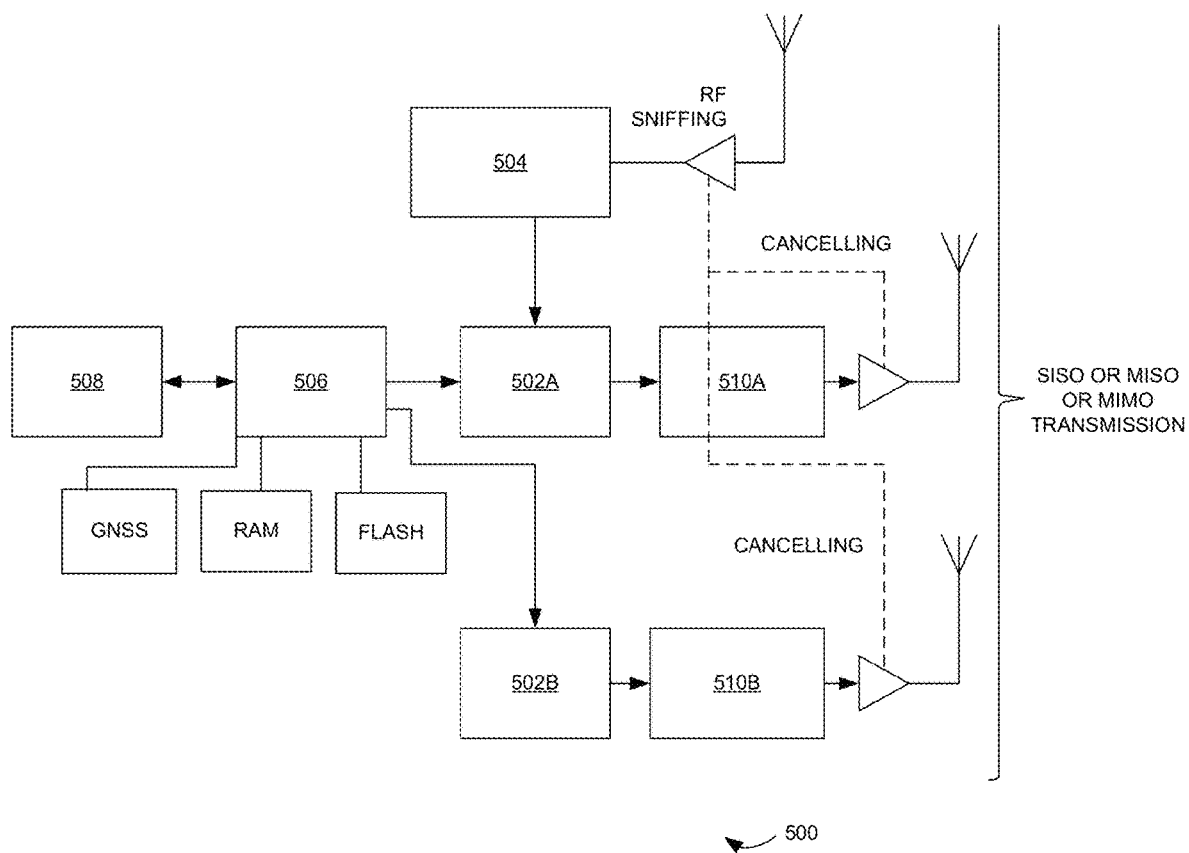
FIG. 5 is a block diagram of at least one Broadcast Radio Head (BRH) according to some embodiments herein.

FIG. 5 is a block diagram 500 of the at least one BRH 224 according to some embodiments herein. The at least one BRH 224 includes software-defined radio (SDR) platforms 502A-B, an RF down-conversion unit 504, an application processor 506, an Ethernet interface 508 and RF up conversion units 510A-B. The SDR platforms 502A-B may ensure that same hardware can cater to any broadcast standards, e.g. ATSC 3.0, ATSC 1.0, DVB-T2, DVB-T, DVB-T2 Lite, FeMBMS, ISDB-T, DTMB, etc. to support legacy deployments The SDR platforms 502A-B may allow different variants of the same standard to be configured on-the-fly to take care of terrain, UE velocity, etc. The Ethernet interface 508 is logically partitioned into two different networks based on different VLAN Tags. The two different networks are a first network that corresponds to a broadcast SFN network and a second network that corresponds to a unicast L2-tunnel. The Ethernet interface 508 interfaces to a core network through the IP Backhaul network 212. In some embodiments, a radio interface, both streams may time share the same carrier or allocated different carriers for simplifying network operations. In some embodiments, a BO-GW that ensures packets that are received and the IP Backhaul network 212 maintains the packets. In some embodiments, the Broadcast Offload Service Centre (BO-SC) 310 creates and terminates an IP tunnel. In some embodiments, the application processor 506 maps user IP packets with a compressed header to broadcast specific data link layer functions and sends the mapped user IP packets to the SDR platforms 502A-B. The SDR platforms 502A-B performs forward error correction coding of data, modulation and wave shaping, before up-converting to the RF frequency and radiating. In some embodiments, time alignment of a transmit function, as scheduled in the BO-SC 310 is performed in the application processor 506.

In some embodiments, the generic implementation of the at least one BRH 224 may involve single or a multiple transmit chains which allow implementing a SISO, MISO or a MIMO in the at least one Broadcast Radio Head (BRH) 224 based unidirectional downlink. Depending on the capabilities a User Equipment may have single or multiple antennas, the RF and a Signal processing chains based on whether it is optimized for cost, power or performance. In an example, the UE in the form of a smartphone or a tablet is likely to have a single antenna and a single RF chain due to constraints of power and form factor. A CPE or a vehicular UE may include more headroom in terms of power consumption, size, and cost. In such a case a MIMO based system may be implemented.

Figure 6:
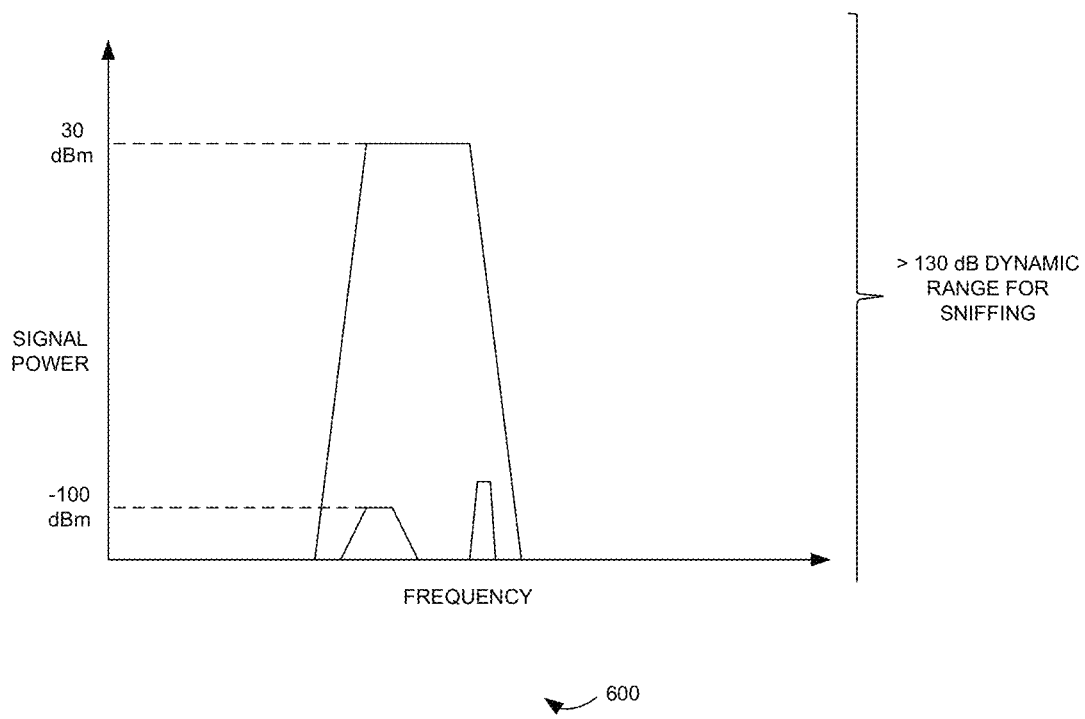
FIG. 6 illustrates a graphical representation of detecting a weak interfering signal in the presence of a strong transmit signal according to some embodiments herein.

FIG. 6 illustrates a graphical representation 600 of detecting a weak interfering signal in the presence of a strong transmit signal according to some embodiments herein. In an SFN mode, multiple Broadcast Radio Heads may be configured in a distributed MISO scheme. The distributed MISO scheme removes destructive spectral interference when power differences are small, and signals are seen at a UE receiver. In some embodiments, at least one BRH 224 includes features of cognitive RF sensing to determine blockers or interferers at an in-band of operation and an out-of-band of operation. The at least one BRH 224 measures spectral leakage from adjacent channels. In some embodiments, a self-interference cancellation scheme is used in the at least one BRH 224 to prevent a receiver from de-sensitization and enable the at least one BRH 224 to capture weak signals. The at least one BRH 224 measures received signal strength and signal to interference and noise ratio (SINR). The at least one BRH 224 receives a reference signal from at least one equipment in a cluster of BRHs at a network. In some embodiments, the reference signal may enable the at least one BRH 224 to identify the delay spread of a channel between BRHs. In some embodiments, all the BRHs include GNSS receiver to measure a propagation delay.

Figure 7:
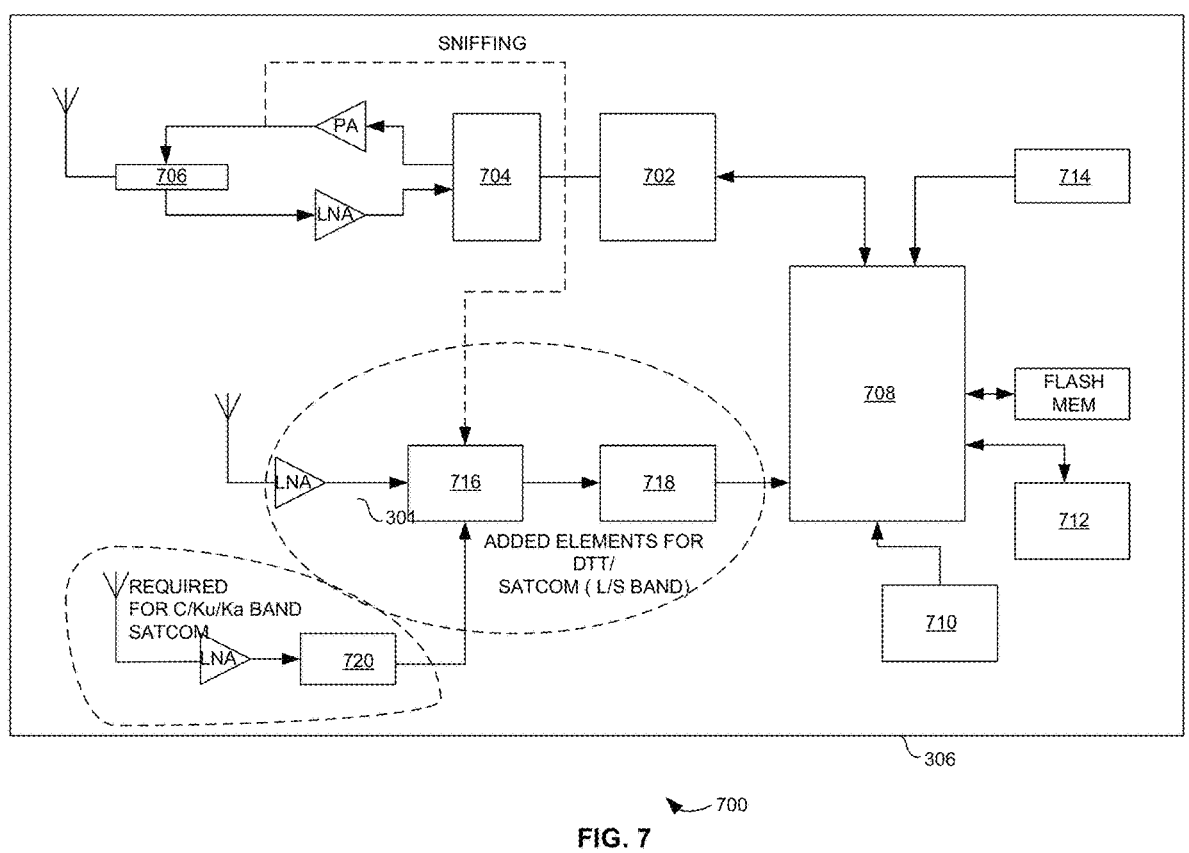
FIG. 7 is a block diagram that illustrates a hybrid cellular User Equipment (UE) with a unidirectional downlink capability according to some embodiments herein.

FIG. 7 is a block diagram 700 that illustrates the hybrid cellular user equipment (UE) 306 with a unidirectional downlink capability according to some embodiments herein. The hybrid cellular user equipment (UE) 306 with the unidirectional downlink capability includes a cellular modem 702, a RF transceiver 704, a duplexer 706, an application processor 708, inertial sensors 710, a crypto module 712, a GNSS receiver 714, an SDR receiver 718, a RF down converter 716 and an LNB 720. In some embodiments, the hybrid cellular user equipment (UE) 306 is capable of receiving at least one of (i) cellular signals or a Wi-Fi, and (ii) unidirectional downlink signals. In some embodiments, the hybrid cellular user equipment (UE) 306 conveys a packet error rate, bit error rates, and a signal-to-interference-plus-noise ratio (SINR) to the analytics engine 301 for enabling the at least one Broadcast Radio Head (BRH) 224 to modify a modulation-coding scheme and to determine the scheduler delay. The cellular modem 702 processes lower layers of a protocol stack up to an IP layer corresponding to a cellular/Wi-Fi standard. The SDR receiver 718 implements physical layer functions and link layer functions. In some embodiments, the application processor 708 implements link layer functions. In some embodiments, higher layer functions, e.g. transport layer and above are implemented in the application processor 708. In some embodiments, the hybrid cellular UE 306 includes a bridging function (as shown in FIG. 7) that transfers data from the SDR receiver 718 for a unidirectional link. In some embodiments, the hybrid cellular UE 306 includes an additional bridging function that moves cellular data from the application processor 708 and the cellular modem 702.

In some embodiments, the hybrid cellular UE 306 includes a unidirectional downlink signal receiver that measures reference signal power, delay spread, and SINR. In some embodiments, an observed time difference of arrival (OTDoA) of reference signals that are received from a multitude of the at least one BRH 224 are determined and uploaded to the analytics engine 301 through a Cellular uplink. In some embodiments, an information of the OTDoA of the reference signals enable finding a location of the hybrid cellular UE 306. The at least one BRH 224 modifies the modulation-coding scheme based on packet error rate or bit error rates conveyed to the analytics engine 301. The inertial sensors 710 provide additional information about the speed of the hybrid cellular UE 306 to enable unidirectional downlink signal parameters to be optimized depending on mobility conditions. In some embodiments, the additional information about the speed of the hybrid cellular UE 306 may involve modifying FFT size, carrier spacing, pilot patterns to take care of Doppler spread and a type of time and frequency inter-leaver to be used. The crypto module 712 generates and stores a device identifier corresponding to a unidirectional downlink network.

Figure 8A:
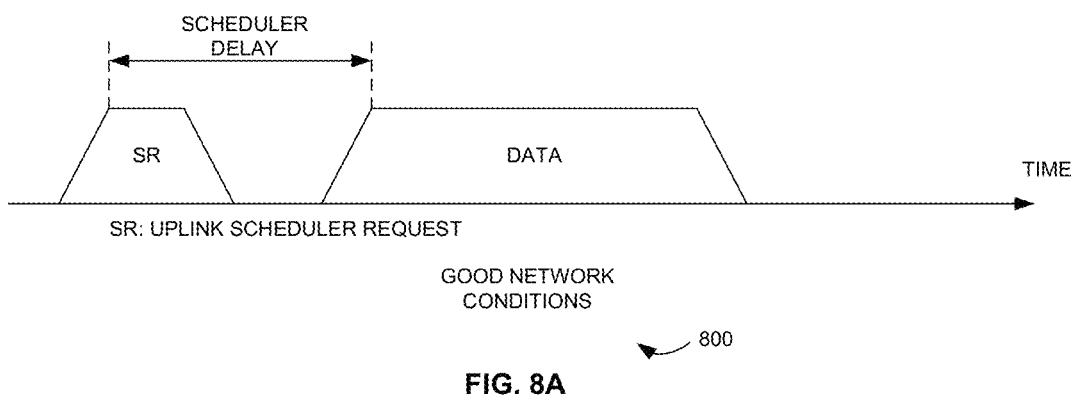
FIGS. 8A-8B are graphical representations that illustrate a method of determining scheduling latency by sniffing a cellular uplink signal according to some embodiments herein.
Figure 8B:
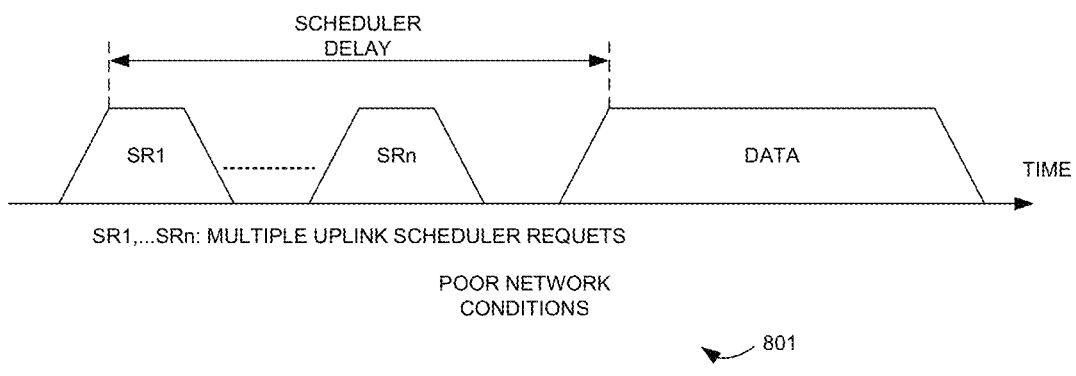

FIGS. 8A-8B are graphical representations that illustrate a method of determining scheduling latency by sniffing a cellular uplink signal according to some embodiments herein. A graphical representation 800 (as shown in FIG. 8A) that depicts measurement of a time interval between a first uplink scheduler request and an actual transmission of data is interpreted as a measure of congestion. The graphical representation 800 depicts the first uplink scheduler request for good network conditions. A graphical representation 801 (as shown in FIG. 8B) that depicts one or more schedule requests may be sent before the actual data transfer in uplink happens for a heavily congested network. In some embodiments, scheduler delay between the first scheduler request and the actual data transfer at the good network conditions is less as compared to the scheduler delay between the one or more schedule requests and the actual data transfer at the poor network conditions. In some embodiments, this information is gathered by snooping an uplink signal by the SDR receiver 718 (as shown in FIG. 7) which reaches via the RF downconverter 716. In some embodiments, the hybrid cellular UE 306 provides information on parameters corresponding to reference signal power, delay spread and SINR for a unidirectional downlink network. In some embodiments, the hybrid cellular UE 306 provides Bit error and packet error rates.

The Element Management System (EMS) 308 may provide information on (i) alarms and performance logs from cellular base stations, the IP backhaul network 212 and a cellular packet core network and (ii) a transmit buffer queue status in a cellular downlink as reported by the cellular base station 222. In some embodiments, packet loss in the IP backhaul network 212 and the cellular packet core may enable in identifying congestion which may results in offload to a unidirectional downlink radio network from the cellular packet core network. In an uplink direction, the transmit buffer queue is reported by the hybrid cellular UE 306 to the cellular base station 222 for the cellular uplink. In some embodiments, length of the queue indicates congestion.

Figure 9:
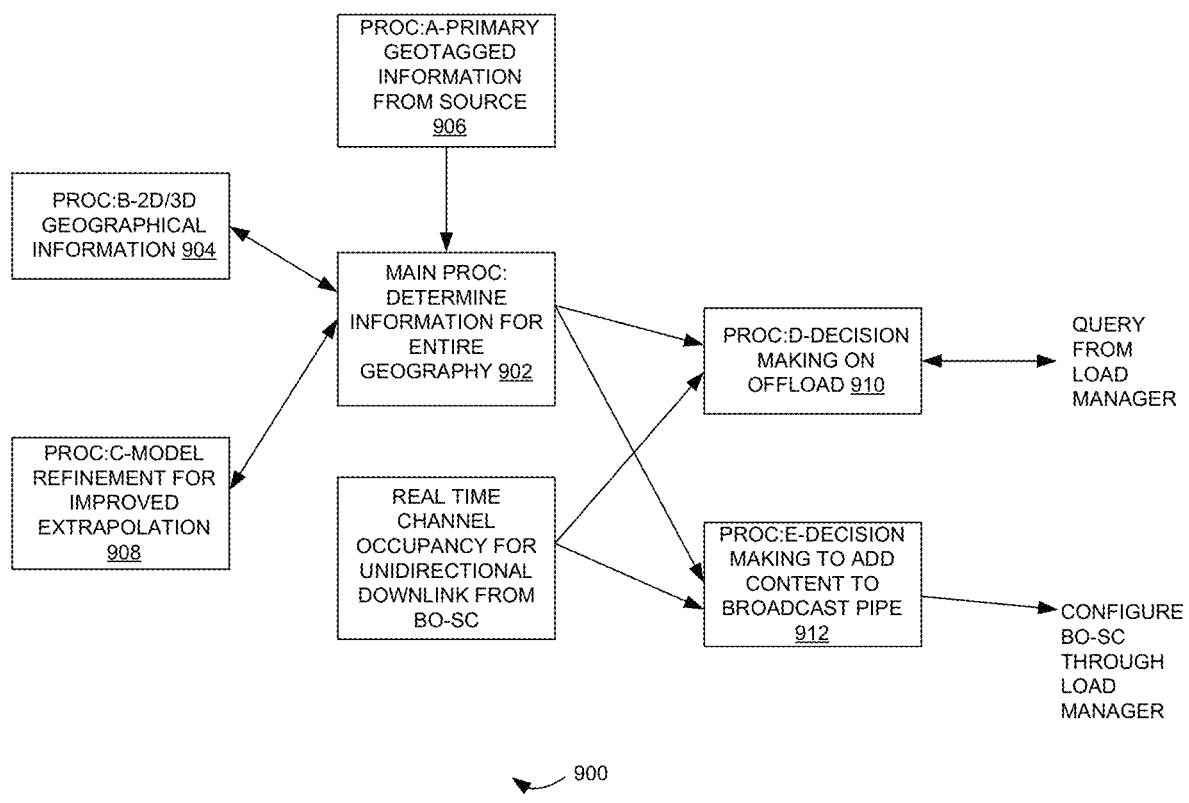
FIG. 9 is a flow diagram that illustrates a process of the analytics engine according to some embodiments herein.

FIG. 9 is a flow diagram 900 illustrates a process 900 of the analytics engine 301 according to some embodiments herein. At step 902, the process 900 includes determines information for entire geography that includes RF parameters such as signal strengths, SINR, rank, and coefficients of channel matrix for MIMO/MISO/SISO expected modulation and coding, etc. of a cellular downlink and a unidirectional Downlink over a given place. In some embodiments, step 902 is named as a process named Main Proc (as shown in FIG. 9).

At step 904 (a process named Proc B), the process 900 includes receives spatial information in the form of 3D and 2D maps from 2D/3D geographical information. At step 906 (a process named Proc A), the process 900 includes gathering primary geotagged RF information from the source, by which all the primary information is gathered and mapped into the spatial information. At step 908 (a set of processes named Proc C model), the process 900 includes refinements for improved extrapolation, by which this data is extrapolated throughout a region using RF prediction tools and machine learning algorithms.

At step 910 (a process named Proc D decision making on offload), the process 900 includes flags computed/derived at each location on the map to indicate whether the unidirectional downlink or the cellular channel is best means of reaching the hybrid cellular UE 306 based on a level of network congestion and the RF conditions, both measured and estimated. In some embodiments, when the Load manager 304 queries for given latitude and longitude, results are readily available. In some embodiments, real-time information on a channel occupancy of the unidirectional downlink, available through the BO-SC 310 is considered before a final decision is taken.

At step 912, (an additional process named Proc E decision making to add content to broadcast pipe), the process 900 includes adding content to a broadcast pipe by monitoring contents being consumed. In some embodiments, primary information of the same is available from the load manager 304 (as shown in FIG. 3). The analytics engine 301 decides the contents that may be communicated over the broadcast channel, either as live streaming or in a non-real time basis by caching as determined from the primary information. In some embodiments, an actual configuration and broadcasting are done by the load manager 304 through the BO-SC 310.

The load manager 304 queries the analytics engine 301 using latitude and longitude of the hybrid cellular UE 306. The analytics engine 301 reverts with the information on a best RAN network or the cellular base station 220 to serve the hybrid cellular UE 306. In some embodiments, the best BRH along with an optimal modulation and coding is provided by the analytics engine 301 for the unidirectional downlink. The analytics engine 301 may provide an optimal pre-coding matrix for the BRH supporting MISO and MIMO. In some embodiments, a MIMO or MISO based BRH, the location information and past statistics for Non-Line of Sight (NLOS) and Line-of-Sight (LOS) propagation, the optimal pre-coding matrix is determined. This is of importance in the case of millimeter-wave being used for the unidirectional downlink network.

Figure 10:
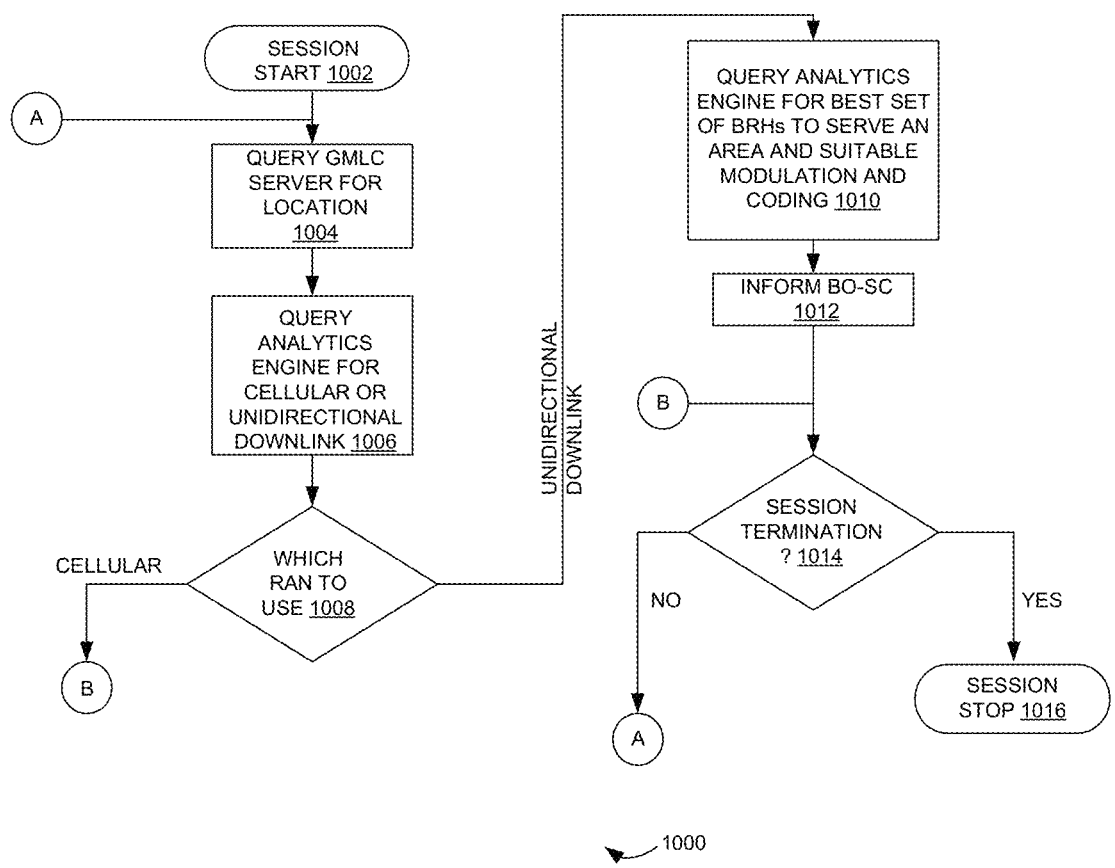
FIG. 10 is a flow chart illustrating management of call sessions and handoffs in a load manager according to some embodiments herein.

FIG. 10 is a flowchart illustrating management of call sessions and handoffs 1000 in the load manager 304 according to some embodiments herein. In some embodiments, the handoff mechanism is based on a location-based service. In some embodiments, Internet-of-Things specific communication protocols such as Narrowband Internet-of-things (NB-IoT), Long Range (LoRa) wireless techniques, etc. may be used to update location information, as an alternative to cellular connectivity to select the at least one BRH 224 to serve a user. At step 1002, the management of call sessions and handoffs 1000 includes the start of a session. At step 1004, the management of call sessions and handoffs 1000 includes, queries a location of the hybrid cellular UE 306 from a GMLC server by the load manager 304. At step 1006, the management of call sessions and handoffs 1000 includes queries the analytics engine 301 on the best way to serve a user of a cellular or unidirectional downlink. At step 1008, the management of call sessions and handoffs 1000 includes checks which RAN to use for the cellular and the unidirectional downlink. At step 1010, the management of call sessions and handoffs 1000 queries the analytics engine 301 to detect that the chosen RAN to be used is the unidirectional downlink and then the analytics engine 301 determines a best set of BRHs to serve an area with a suitable combination of Transmit Power, modulation and coding. At step 1012, the management of call sessions and handoffs 1000 includes informing the Broadcast Offload Service Centre (BO-SC) 310 to schedule a request. At step 1014, the management of call sessions and handoffs 1000 includes termination of the session. In some embodiments, if the management of call sessions and handoffs 1000 queries the analytics engines 301 detects the chosen RAN to be used as the cellular network, the session may continue until it terminates on completion. On termination of the session, the management of call sessions and handoffs 1000 reaches step 1016 where the session stops. In some embodiments, the analytics engine 301 does not maintain call flow states. In some embodiments, the management of call sessions and handoffs 1000 runs on the load manager 304 and accesses the analytics engine 301.

Figure 11:
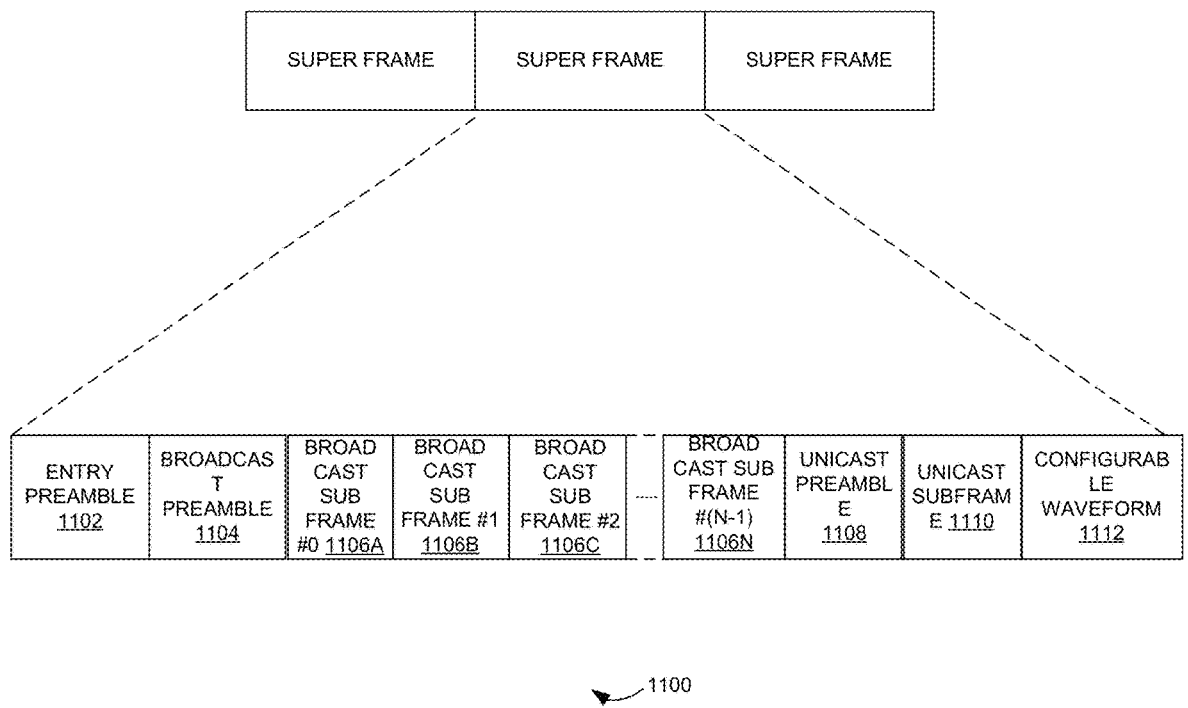
FIG. 11 is a block diagram that illustrates a super-frame and a Super-frame Structure for an Offload Radio Network according to some embodiments herein.

FIG. 11 is a block diagram 1100 that illustrates a super-frame and a Super frame Structure for an Offload Radio Network according to some embodiments herein. The super frame and the super frame structure of a unidirectional downlink (offload) air interface enables addressing a Single Frequency Network (SFN) and Unicast networks. In some embodiments, a concept of Coordinated Multipoint downlink may be used to provide better signal quality at cell edges for a unicast network. In some embodiments, chosen waveform leverages on next-generation broadcast waveform concepts with additional support for unicast download traffic. The super frame structure includes an Entry preamble 1102, a broadcast preamble 1104, and broadcast subframes #0–# (N−1) 1106A-N, a unicast preamble 1108, a unicast subframe 1110, and a configurable waveform 1112. In some embodiments, one or more frames constitute a Super-frame. In a most degenerate form, the Super-frame may include the Broadcast preamble 1104 and the Broadcast sub-frames #0–# (N−1) 1106A-N in addition to the Entry Preamble 1102 if the offload network is in a Broadcast mode. In some embodiments, a Super-frame may include the Unicast Preamble 1108 and the Unicast sub-frame 1110 if the offload network is in a Unicast mode.

The Entry Preamble 1102 decides one or more parameters that are useful for the hybrid cellular UE 306 that receives an offload waveform for demodulation. The Entry Preamble 1102 signals the most basic information and is extremely robust. The most basic information may be received by different UEs which is capable of receiving it even under adverse channel conditions. In some embodiments, the entry preamble 1102 is intended to be used by receivers for synchronization and tracking. In some embodiments, the entry preamble 1102 receives signals below noise floor (e.g. SNR=−6 dB or −12 dB) in difficult channels such as 0 dB echoes or typical urban channels based on design of the entry preamble waveform. The entry preamble 1102 includes one or more OFDM symbols with a first symbol reserved for synchronization. In some embodiments, subsequent symbols include information such as version number, sampling rate indicator of the current frame, and signals the parameters required to perform demodulation and decoding of subsequent preamble structures (i.e. Broadcast preamble and unicast preamble). The Entry Preamble 1102 includes control bits to signify if an associated frame includes broadcast only sub-frames, unicast only sub-frames or has a mix of both Broadcast and Unicast sub-frames. The control bits specify the gap between the start of the Broadcast Preamble 1104 and the Unicast Preamble 1108 if there is a mix of both types of sub-frames. In case of unicast only transmission, the Entry Preamble 1102 is immediately followed by the Unicast preamble 1108 followed by the unicast sub-frames 1110, without any gaps.

In some embodiments, the Broadcast Preamble 1104 occurs once every frame (if Entry Preamble 1102 signifies the frame type as Broadcast only or mixed type) before the Broadcast sub-frames #0–# (N−1) 1106A-N. In some embodiments, the Broadcast Preamble 1104 includes one or more OFDM symbols and is used to convey a Broadcast Physical layer signaling needed to access a payload carried by the subsequent Broadcast sub-frames #0–# (N−1) 1106A-N. In some embodiments, signaling content in a preamble may be organized into hierarchical components such as a linked list with some basic and some detailed information. In some embodiments, basic signaling is typically available in a fixed number of bits and uses a known modulation and coding parameter. In some embodiments, detailed signaling bits in the preamble are typically modulated with a robust constellation (e.g. BPSK, QPSK) and encoded using robust Forward Error Correction (FEC) schemes (e.g. Viterbi, LDPC, Turbo) with extremely high coding gain. In some embodiments, additional protection from fading and burst errors on signaling fields is ensured by adopting frequency interleaver with significant interleaving gain or by repetition coding. A set of value combinations may available for waveform parameters of the preamble OFDM symbols. The set of value combinations includes fixed modes for Guard Interval (GI), FFT Size (FFT) and Scattered Pilot Patterns that include denser pilots for robust and speedy channel estimation.

The Broadcast sub-frames #0 to -# (N-1) 1106A-N include the payload corresponding to the Broadcast Traffic received from a Gateway. In some embodiments, broadcast data is input and formatted in an Input Formatting module and forward error correction is applied and mapped to constellations in a BICM module. Interleaving, in both time and frequency domains, and frame creation is done in a Framing and Interleaving module. In some embodiments, an output waveform is created in a Waveform Generation module. The sub-frames may include multiple OFDM symbols which range from 2K-32K FFT sizes.

Figure 12:
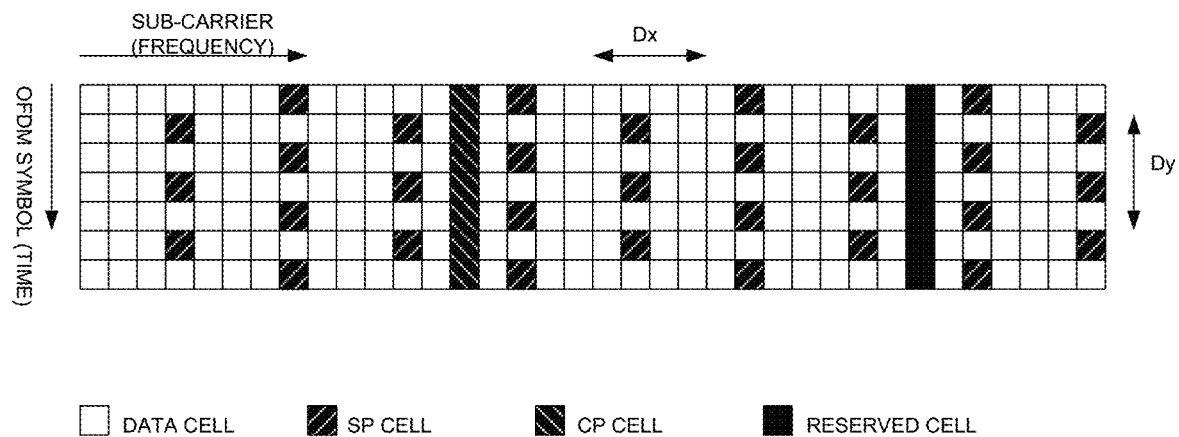
FIG. 12 illustrates a Scattered Pilot and a Continual Pilots OFDM subcarriers according to some embodiments herein.

FIG. 12 is a Scattered Pilot and Continual Pilots OFDM subcarriers 1200 according to some embodiments herein. The OFDM subcarriers 1200 include the additional provision of scattered, continual, edge, preamble and frame closing pilots. These cells are modulated with reference information whose transmitted value is known to a receiver. The pilots are used for frame synchronization, frequency synchronization, time synchronization, channel estimation, transmission mode identification and to track phase noise.

The Unicast Preamble 1108 occurs once every frame if the entry preamble 1102 signifies a frame type as unicast only or mixed type. This is typically one or two OFDM symbol long with a Guard Interval (GI) sufficiently long enough to cover a range of multiple-cells. In some embodiments, all UE's synchronize to an offload radio head, in time and frequency, using the unicast preamble 1108, which may include multiple repetitions of a short training sequence and a long training sequence. The short training sequence is typically used for signal detection, Automatic Gain Control (AGC) diversity selection, coarse frequency offset estimation and timing synchronization. The long training sequence is used for channel estimation and fine frequency offset estimation. The unicast preamble 1108 is thus collectively enabled for synchronization, channel estimation; frequency offset estimation and received power estimation. The unicast preamble 1108 is immediately followed by the unicast sub-frame 1110. In some embodiments, the UE's which are receiving data in unicast mode may lock to the unicast preamble 1108 to robustly identify the start of the unicast sub-frame 1110.

The Unicast sub-frame 1110 includes control and payload corresponding to serve multiple UE's in a specified region. In some embodiments, the unicast sub-frame 1110 is intended to serve the multiple UE's which are connected to a RAN network whenever an offload unicast request is serviced. The Unicast sub-frame 1110 includes a Unicast sub-frame Control Header (UCH) followed by a Downlink Map (DLMAP) and Downlink Channel Descriptor (DCD) fields. The Unicast sub-frame control header field includes information on size of the DLMAP and size of the unicast frame in terms of the OFDM symbols. The DLMAP includes information on how the resources are scheduled for user bursts which contain the unicast payload and the field to represent Broadcast Radio head ID (BRH-ID). The DCD is transmitted by an offload radio head and describes characteristics of a downlink physical channel.

Figure 13:
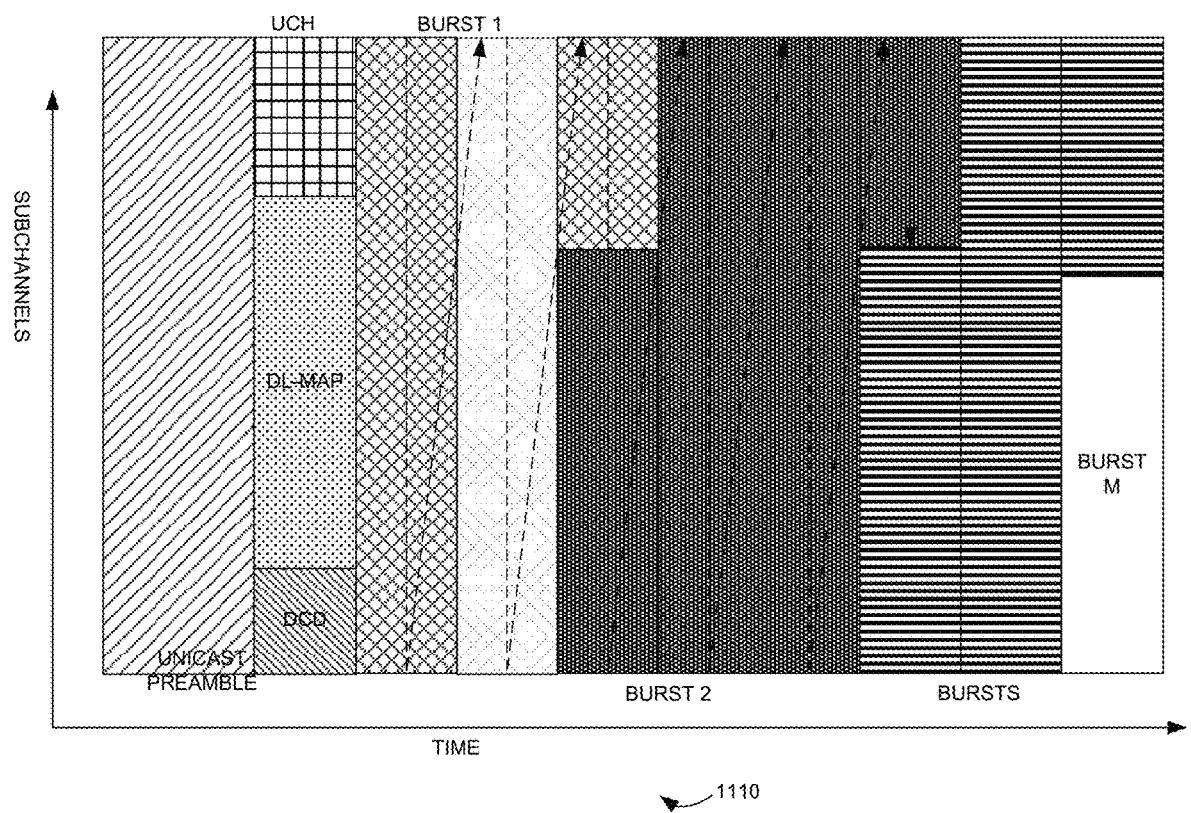
FIG. 13 illustrates a Unicast Sub-frame according to an example embodiment herein.

FIG. 13 illustrates the Unicast Sub-frame 1110 according to an example embodiment herein. In some embodiments two-dimensional (time/frequency) structure of a MAC, the frame includes an integer number of fixed sizes OFDM slots. Each slot includes an OFDM symbol by one subchannel (i.e., 1 OFDM slot=1 symbol×1 subchannel). In FIG. 13, MAC packets are assumed to be structured in a linear TDM (Time-division multiplexed) manner while PHY packets are arranged in a two-dimensional time/frequency domain (symbol in the horizontal direction, logical subchannels in the vertical direction). For a Unicast sub-frame Control Header (UCH), a Downlink Map (DLMAP), Downlink Channel Descriptor (DCD) fields and a downstream payload, the MAC information is first laid vertically by subchannels then stepped horizontally in the time direction. This vertical layering allows early scheduling of DL bursts assigned to distant UEs to compensate for propagation delays.

In addition to unicast and broadcast sub-frames, an optional timeslot in the frame structure enables insertion of the configurable waveform 1112 in the at least one BRH 224 for channel sounding applications. To minimize overheads associated with a framing process, the DL-MAP may inform the hybrid cellular UE 306 if there is any omission of the broadcast sub-frame, the unicast sub-frame or the configurable waveform part of the frame. This is important especially for the configurable waveform section, which may be used for channel sounding during low load periods. One of the important fields present in the DLMAP is an identity of the at least one Broadcast Radio Head (BRH-ID) 224. A family of orthogonal signals indexed by a common parameter may be used to represent this field. In some embodiments, the identity of the at least one BRH 224 may be mapped to an index mentioned. Repetition of this index (and hence the orthogonal sequence) may be done only if the hybrid cellular UE 306 does not view two or more BRHs with the same index. In some embodiments, under no circumstance, two different BRHs transmission signals ever interfere with each other.

Figure 14:
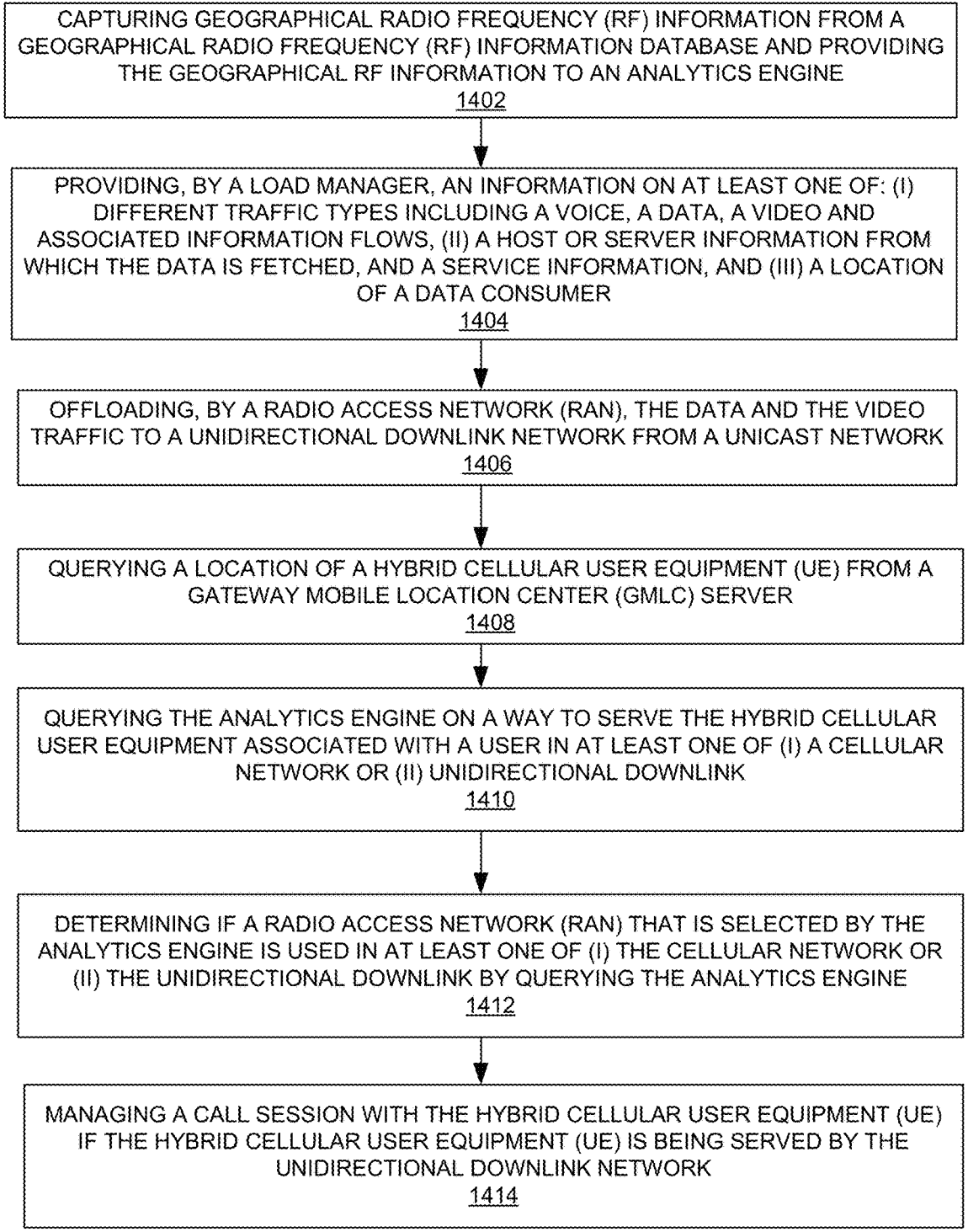
FIG. 14 is a flow diagram that illustrates a method for dynamically offloading data and video traffic to a broadcast offload core network from a cellular network or to the cellular network from the broadcast offload core network according to some embodiments herein.

FIG. 14 is a flow diagram that illustrates a method 1400 for dynamically offloading data and video traffic to a broadcast offload core network from a cellular network or to the cellular network from the broadcast offload core network according to some embodiments herein. At step 1402, the method 1400 includes capturing geographical radio frequency (RF) information from a geographical radio frequency (RF) information database and providing the geographical radio frequency (RF) information to the analytics engine 301. The geographical radio frequency (RF) information includes (i) an operator infrastructure information, (ii) a physical terrain information, (iii) a subscriber information, (iv) a coverage information, (v) a signal quality information, and (vi) telecom traffic patterns. The analytics engine 301 determines whether to offload the data and the video traffic to at least one of (i) a unidirectional downlink network from a unicast network or (ii) the unicast network from the unidirectional the hybrid cellular user equipment (UE) 306 from a particular geographical location that are trying to access the data or video content. At step 1404, the method 1400 includes providing, by the load manager 304, an information on at least one of (i) different traffic types including a voice, the data, the video, and associated information flows, (ii) a host or server information from which the data is fetched, and service information, (iii) a location of a data consumer that is obtained from at least one of (a) a gateway mobile location center (GMLC) server or (b) a global navigation satellite system (GNSS) coordinates, and (iv) a user information and an identity of the hybrid cellular user equipment (UE) 306 to the analytics engine 301. At step 1406, the method 1400 includes offloading, by a radio access network (RAN), the data and the video traffic to a unidirectional downlink network from a unicast network. The radio access network (RAN) includes the at least one broadcast radio head (BRH) 224. The unidirectional downlink network is operated in two modes that include a broadcast mode operating as a single frequency network SFN Multi-frequency network (MFN), and a unicast mode. The at least one broadcast radio head (BRH) 224 is selected by the analytics engine 301 based on the information provided by the load manager 304 on the hybrid cellular user equipment (UE) 306 from the particular geographical location that are trying to access the data or the video content. The analytics engine 301 determines the at least one Broadcast Radio Head (BRH) 224 to serve the hybrid cellular user equipment (UE) 306 with at least one of (i) a transmit power, (ii) a modulation or (iii) coding.

In some embodiments, the load manager 304 performs a method of handling call sessions and implementing handoffs from the unicast network over the unidirectional downlink network. At step 1408, the method 1400 includes querying a location of the hybrid cellular user equipment (UE) 306 from the Gateway Mobile Location Center (GMLC) server. At step 1410, the method 1400 includes querying the analytics engine 301 on a way to serve the hybrid cellular user equipment 306 associated with a user in at least one of (i) a cellular network or (ii) unidirectional downlink. At step 1412, the method 1400 includes determining if the radio access network (RAN) that is selected by the analytics engine 301 is used in at least one of (i) the cellular network or (ii) the unidirectional downlink by querying the analytics engine 301. At step 1414, the method 1400 includes managing a call session with the hybrid cellular user equipment (UE) 306 if the hybrid cellular user equipment (UE) 306 is being served by the unidirectional downlink network.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for dynamically offloading data and video traffic to an overlay unidirectional downlink radio network and a broadcast offload core network from a cellular network or to the cellular network from the broadcast offload core network, the system comprising:

an analytics engine that captures geographical radio frequency (RF) information from a geographical radio frequency information database, wherein the geographical RF information comprises (i) an operator infrastructure information, (ii) a physical terrain information, (iii) a subscriber information, (iv) a coverage information, (v) a signal quality information, and (vi) telecom traffic patterns, wherein the analytics engine determines whether to offload the data and the video traffic to at least one of (i) a unidirectional downlink network from a unicast network or (ii) the unicast network from the unidirectional downlink network by analyzing at least one hybrid cellular user equipment (UE) from a particular geographical location that are trying to access the data or video content;

a load manager that provides an information on at least one of: (i) different traffic types comprising a voice, the data, the video traffic, and associated information flows, (ii) a Host or Server information from which the data is fetched, and a service information, (iii) a location of a data consumer that is obtained from at least one of (a) a Gateway Mobile Location Center (GMLC) server or (b) a Global Navigation Satellite System (GNSS) coordinates, and (iv) a user information and an identity of the at least one hybrid cellular user equipment (UE) to the analytics engine; and a radio access network (RAN) that comprises at least one Broadcast Radio Head (BRH) for offloading the data and the video traffic to the unidirectional downlink network from the unicast network, wherein the unidirectional downlink network is operated in two modes that comprise a broadcast mode operating as a single frequency network (SFN) or Multi-frequency network (MFN), and a unicast mode, wherein the at least one Broadcast Radio Head (BRH) is selected by the analytics engine based on the information provided by the load manager on the at least one hybrid cellular user equipment (UE) from the particular geographical location that are trying to access the data or the video content, wherein the analytics engine determines the at least one Broadcast Radio Head (BRH) to serve the at least one hybrid cellular user equipment (UE) with at least one of (i) a transmit power, (ii) a modulation or (iii) coding, wherein the load manager performs a method of handling call sessions and implementing handoffs from the unicast network over the unidirectional downlink network, the method comprising:

querying a location of the at least one hybrid cellular user equipment (UE) from the Gateway Mobile Location Center (GMLC) server, wherein the broadcast offload core network determines whether to offload the data and the video traffic in the broadcast mode operating as the single frequency network (SFN) or the unicast mode based on the location of the at least one hybrid cellular user equipment (UE);

querying the analytics engine on a way to serve the at least one hybrid cellular user equipment associated with a user in at least one of (i) a cellular network or (ii) unidirectional downlink;

determining if the radio access network (RAN) that is selected by the analytics engine is used in at least one of (i) the cellular network or (ii) the unidirectional downlink by querying the analytics engine; and managing a call session with the at least one hybrid cellular user equipment (UE) if the at least one hybrid cellular user equipment (UE) is being served by the unidirectional downlink network.

2. The system of claim 1, wherein the at least one hybrid cellular user equipment (UE) is capable of receiving at least one of (i) cellular signals or a Wi-Fi, and (ii) unidirectional downlink signals, wherein the at least one hybrid cellular user equipment (UE) conveys a packet error rate, bit error rates, network congestion indication using uplink scheduler delays and a signal-to-interference-plus-noise ratio (SINR) to the analytics engine for enabling the at least one Broadcast Radio Head (BRH) to modify a modulation-coding scheme of transmission in a given region.

3. The system of claim 2, wherein if the at least one hybrid cellular user equipment (UE) associated with the user moves from one cell to another cell, overall performance remains consistent and continuity of service is ensured.

4. The system of claim 1, wherein the unidirectional downlink network is partitioned into multiple clusters of Broadcast Radio Heads (BRHs), where a coordinated downlink that is implemented for a group of BRHs involved in each cluster.

5. The system of claim 1, wherein the unidirectional downlink network is utilized for serving a unicast, broadcast or multicast service, a return channel of existing RAN network is used.

6. The system of claim 1, wherein the overlay unidirectional downlink radio network based on a Digital Terrestrial Transmission (DTT) in conjunction with the RAN dynamically switches the unidirectional downlink network between a broadcast SFN mode or a broadcast Multi-frequency network (MFN) mode and a unicast downlink mode or a multicast downlink mode.

7. The system of claim 1, wherein the group of Broadcast Radio Heads (BRHs) are in at least one of (i) the broadcast SFN mode, or the broadcast MFN mode, or (ii) the unicast downlink mode or the multicast downlink mode.

8. The system of claim 1, wherein a unidirectional downlink that acts as supplemental downlink via at least one of (i) a digital terrestrial or (ii) a satellite network.

9. The system of claim 1, wherein the analytics engine creates a "Dynamic Virtual edge" contour by appropriately determining the at least one hybrid cellular user equipment (UE) in a given region based on the geographical RF information that is stored in the geographical RF information database, wherein appropriate BRHs are selected to schedule an offload transmission based on the "dynamic virtual edge".

10. The system of claim 1, wherein the at least one Broadcast Radio Head (BRH) comprises single transmit chains or multiple transmit chains for implementing at least one of (i) a single-input single-output (SISO), (ii) a Multiple Input Single Output (MISO) or (iii) a multiple-input and multiple-output (MIMO) configuration in the at least one Broadcast Radio Head (BRH) based the unidirectional downlink network.

11. The system of claim 1, wherein the at least one Broadcast Radio Head (BRH) comprise a radio frequency (RF) sniffing mechanism for sensing an ambient radio frequency (RF) environment incorporating a transmit signal cancellation mechanism for improved measurements.

12. The system of claim 1, comprises a radio frequency (RF) prediction model that predicts signal strengths, the Signal to Interference Noise Ratio (SINR) and a Channel State Information (CSI) for a geographical region of interest using a radio frequency (RF) propagation modeling system.

13. The system of claim 1, wherein the load manager provides the information on a measured packet jitter in a real-time transport protocol (RTP) traffic from which network congestion is inferred by the analytics engine.

14. The system of claim 10, wherein an observed time difference of arrival (OTDoA) of reference signals that are received from a multitude of the at least one BRH are determined and uploaded to the analytics engine through a Cellular uplink, wherein an information of the OTDoA of the reference signals enable finding a location of the at least one hybrid cellular UE.

15. The system of claim 3, wherein the at least one hybrid cellular UE includes inertial sensors that provide additional information about speed of the at least one hybrid cellular UE to enable unidirectional downlink signal parameters to be optimized depending on mobility conditions.

16. The system of claim 1, comprises a frame structure of a unidirectional downlink (offload) air interface for addressing the broadcast mode operating as the single frequency network (SFN) or multi-frequency network (MFN) and the unicast mode, wherein the frame structure comprises broadcast super-frames and unicast super-frames carrying cell-specific reference signals.

17. The system of claim 16, wherein the unicast sub-frames comprise control and a payload to serve multiple user equipment's (UE's) in a specified region using a downlink map.

18. The system of claim 16, wherein the super frame structure comprises an Entry preamble, a broadcast preamble, and broadcast subframes #0–# (N–1), a unicast preamble, a unicast sub-frame, and a configurable waveform.

19. The system of claim 18, wherein the Entry Preamble decides one or more parameters that are useful for the at least one hybrid cellular UE to receive an offload waveform for demodulation, wherein the Entry Preamble signals most basic information and is extremely robust, wherein the most basic information is received by the at least one hybrid cellular UE which is capable of receiving the most basic information at adverse channel conditions.

20. The system of claim 19, wherein receivers use the entry preamble for synchronization and tracking, wherein the entry preamble receives signals below noise floor in difficult channels based on design of an entry preamble waveform.

21. The system of claim 19, wherein the Broadcast sub-frames #0 to # (N–1) comprise the payload corresponding to Broadcast Traffic received from a Gateway.

22. The system of claim 18, wherein an optional timeslot in the frame structure enables insertion of the configurable waveform in the at least one BRH for channel sounding applications.

23. A method for dynamically offloading data and video traffic to an overlay unidirectional downlink radio network and a broadcast offload core network from a cellular network or to the cellular network from the broadcast offload core network, the method comprising:
  capturing, geographical radio frequency (RF) information from a geographical radio frequency (RF) information database and providing the geographical radio frequency (RF) information to an analytics engine, wherein the geographical radio frequency (RF) information comprises (i) an operator infrastructure information, (ii) a physical terrain information, (iii) a subscriber information, (iv) a coverage information, (v) a signal quality information, and (vi) telecom traffic patterns, wherein the analytics engine determines whether to offload the data and the video traffic to at least one of (i) a unidirectional downlink network from a unicast network or (ii) the unicast network from the unidirectional downlink network by analyzing at least one hybrid cellular user equipment (UE) from a particular geographical location that are trying to access the data or video content;
  providing, by a load manager, an information on at least one of: (i) different traffic types comprising a voice, the data, the video and associated information flows, (ii) a Host or Server information from which the data is fetched, and service information, (iii) a location of a data consumer that is obtained from at least one of (a) a Gateway Mobile Location Center (GMLC) server or (b) a Global Navigation Satellite System (GNSS) coordinates, and (iv) a user information and an identity of the at least one hybrid cellular user equipment (UE) to the analytics engine; and offloading, by a radio access network (RAN), the data and the video traffic to a unidirectional downlink network from a unicast network, wherein the radio access network (RAN) comprises at least one Broadcast Radio Head (BRH), wherein the unidirectional downlink network is operated in two modes that comprise a broadcast mode operating as a single frequency network (SFN) or Multi-frequency network (MFN), and a unicast mode, wherein the at least one Broadcast Radio Head (BRH) is selected by the analytics engine based on the information provided by the load manager on the at least one hybrid cellular user equipment (UE) from the particular geographical location that are trying to access the data or the video content, wherein the analytics engine determines the at least one Broadcast Radio Head (BRH) to serve the at least one hybrid cellular user equipment (UE) with at least one of (i) a transmit power, (ii) a modulation or (iii) coding, wherein the load manager performs a method of handling call sessions and implementing handoffs from the unicast network over the unidirectional downlink network, the method comprising:

querying a location of the at least one hybrid cellular user equipment (UE) from the Gateway Mobile Location Center (GMLC) server, wherein the broadcast offload core network determines whether to offload the data and the video traffic in the broadcast mode operating as the single frequency network (SFN) or the unicast mode based on the location of the at least one hybrid cellular user equipment (UE);

querying the analytics engine on a way to serve the at least one hybrid cellular user equipment associated with a user in at least one of (i) a cellular network or (ii) unidirectional downlink;

determining if the radio access network (RAN) that is selected by the analytics engine is used in at least one of (i) the cellular network or (ii) the unidirectional downlink by querying the analytics engine; and managing a call session with the at least one hybrid cellular user equipment (UE) if the at least one hybrid cellular user equipment (UE) is being served by the unidirectional downlink network.

24. The method of claim 23, wherein the at least one Broadcast Radio Head (BRH) comprises single transmit chains or multiple transmit chains for implementing a single-input single-output (SISO), a Multiple Input Single Output (MISO) or a multiple-input and multiple-output (MIMO) configuration in the Broadcast Radio Heads (BRHs) based the unidirectional downlink network.

25. The method of claim 23, wherein the at least one Broadcast Radio Head (BRH) comprises a Radio Frequency (RF) sniffing mechanism for sensing an ambient Radio Frequency (RF) environment incorporating a transmit signal cancellation mechanism for improved measurements.

26. The method of claim 23, wherein the method comprises providing, using the load manager, the information on a measured packet jitter in a real-time transport protocol (RTP) traffic from which network congestion is inferred by the analytics engine.

27. The method of claim 23, wherein the method comprises predicting, by a radio frequency (RF) prediction model, signal strengths, the Signal to Interference Noise Ratio (SINR) and a Channel State Information (CSI) for a geographical region of interest using a radio frequency (RF) propagation modeling system.

* * * * *